(12) United States Patent
Perumana et al.

(10) Patent No.: US 12,041,156 B2
(45) Date of Patent: Jul. 16, 2024

(54) SYSTEMS AND METHODS FOR CONTROLLING TRANSMISSION OF POWER USING ATTENUATION

(71) Applicant: Avago Technologies International Sales Pte. Limited, Singapore (SG)

(72) Inventors: Bevin George Perumana, Anaheim, CA (US); Mohyee Mikhemar, Irvine, CA (US); Tirdad Sowlati, Irvine, CA (US); Alvin Lin, North Andover, MA (US); Sudharshan Srinivasan, Karnataka (IN); Wei-Hong Chen, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/121,959

(22) Filed: Mar. 15, 2023

(65) Prior Publication Data

US 2023/0216654 A1 Jul. 6, 2023

Related U.S. Application Data

(62) Division of application No. 17/207,357, filed on Mar. 19, 2021, now Pat. No. 11,637,686.

(30) Foreign Application Priority Data

Jan. 31, 2021 (IN) .............................. 202121004185

(51) Int. Cl.
*H04L 7/033* (2006.01)
*H04B 1/04* (2006.01)
*H04B 17/345* (2015.01)

(52) U.S. Cl.
CPC ............... *H04L 7/033* (2013.01); *H04B 1/04* (2013.01); *H04B 17/345* (2015.01); *H04B 2001/0408* (2013.01)

(58) Field of Classification Search
CPC ......... H04L 7/033; H04B 1/04; H04B 17/345; H04B 2001/0408; H04B 17/21
See application file for complete search history.

(56) References Cited

U.S. PATENT DOCUMENTS 9,203,158 B2 * 12/2015 Alexopoulos ........ H01Q 15/008
11,075,661 B1 * 7/2021 Jiang ....................... H03F 3/245
(Continued)

OTHER PUBLICATIONS

"Behzad Razavi; "The Current-Steering DAC"; IEEE Solid-State Circuits Magazine, Jan. 31, 2018, pp. 11-15."
(Continued)

*Primary Examiner* — Vineeta S Panwalkar
(74) *Attorney, Agent, or Firm* — Foley & Lardner LLP

(57) ABSTRACT

The present disclosure describes a system that can include an antenna; a receive (Rx) path coupled to the antenna; and a transmit (Tx) path comprising a balun; and a radio frequency (RF) attenuator comprising a first port and a second port, the balun coupled to the first port, the antenna coupled to the second port. The RF attenuator can include a first switch coupled between the first port and the second port; a second switch and a first attenuator coupled to each other in series between the first port and the second port, the first attenuator having a first attenuator value; and a third switch and a second attenuator coupled to each other in series between the first port and the second port, the second attenuator having a second attenuator value greater than the first attenuator value of the first attenuator.

20 Claims, 18 Drawing Sheets

(56) References Cited

U.S. PATENT DOCUMENTS

| | | |
|---|---|---|
| 2003/0078011 A1 | 4/2003 | Cheng et al. |
| 2005/0260949 A1 | 11/2005 | Kiss et al. |
| 2012/0049926 A1 | 3/2012 | Shimizu et al. |
| 2019/0140624 A1* | 5/2019 | Bacon .................. H03H 11/245 |

OTHER PUBLICATIONS

Notice of Allowance on U.S. Appl. No. 17/207,357 DTD Dec. 19, 2022.

* cited by examiner

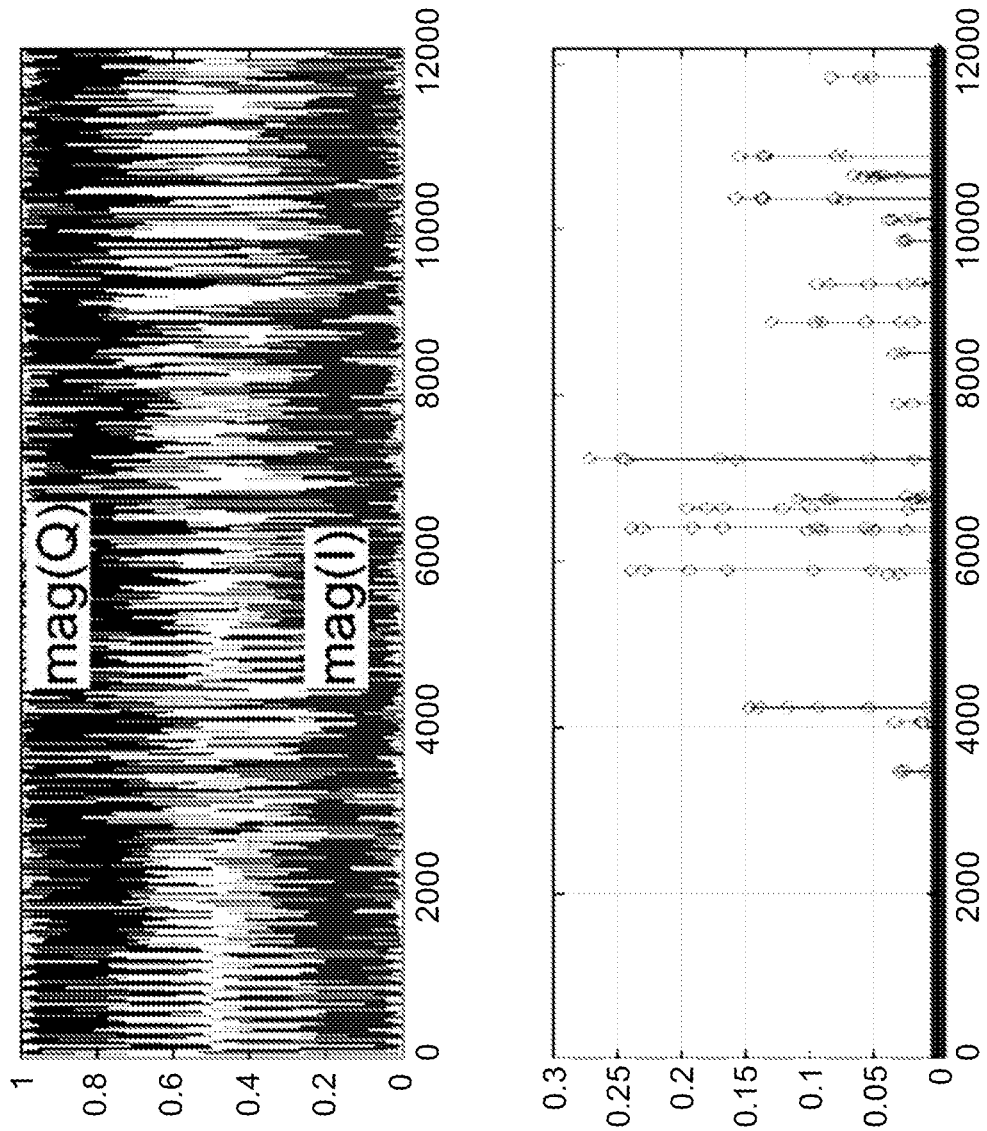

SYSTEMS AND METHODS FOR CONTROLLING TRANSMISSION OF POWER USING ATTENUATION

CROSS-REFERENCE TO RELATED APPLICATIONS

This application claims the benefit of priority as a divisional to U.S. patent application Ser. No. 17/207,357, filed Mar. 19, 2021, which claims the benefit of priority to Indian Provisional Patent Application No. 202121004185, filed Jan. 31, 2021, each of which is incorporated by reference herein in its entirety for all purposes.

FIELD OF THE DISCLOSURE

This disclosure generally relates to a communication system, including but not limited to performing correction of non-linearity due to duty cycle error of a transmission path.

BACKGROUND OF THE DISCLOSURE

Recent developments in communication and computing devices demand higher linearity, reduced chip area, and reduced power consumption. Switched capacitor transmitters and power amplifiers (SC-Tx/PA) may offer a best power efficiency among Tx topologies. However, the SC-Tx/PA arrangement may suffer from sensitivity to power supply impedance and clock overlap, which can cause a degradation in linearity.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 7B is a plot showing overlap of I and Q data bits in communication systems that upconvert using embodiments disclosed herein.

The details of various embodiments of the methods and systems are set forth in the accompanying drawings and the description below.

DETAILED DESCRIPTION

For purposes of reading the description of the various embodiments below, the following descriptions of the sections of the specification and their respective contents can be helpful:

Section A describes a network environment and computing environment which can be useful for practicing embodiments described herein; and Section B describes embodiments of systems and methods for performing coefficient calibration using a loopback and reducing or canceling interference based on the coefficient, according to one or more embodiments.

A. Computing and Network Environment

Figure 1A:
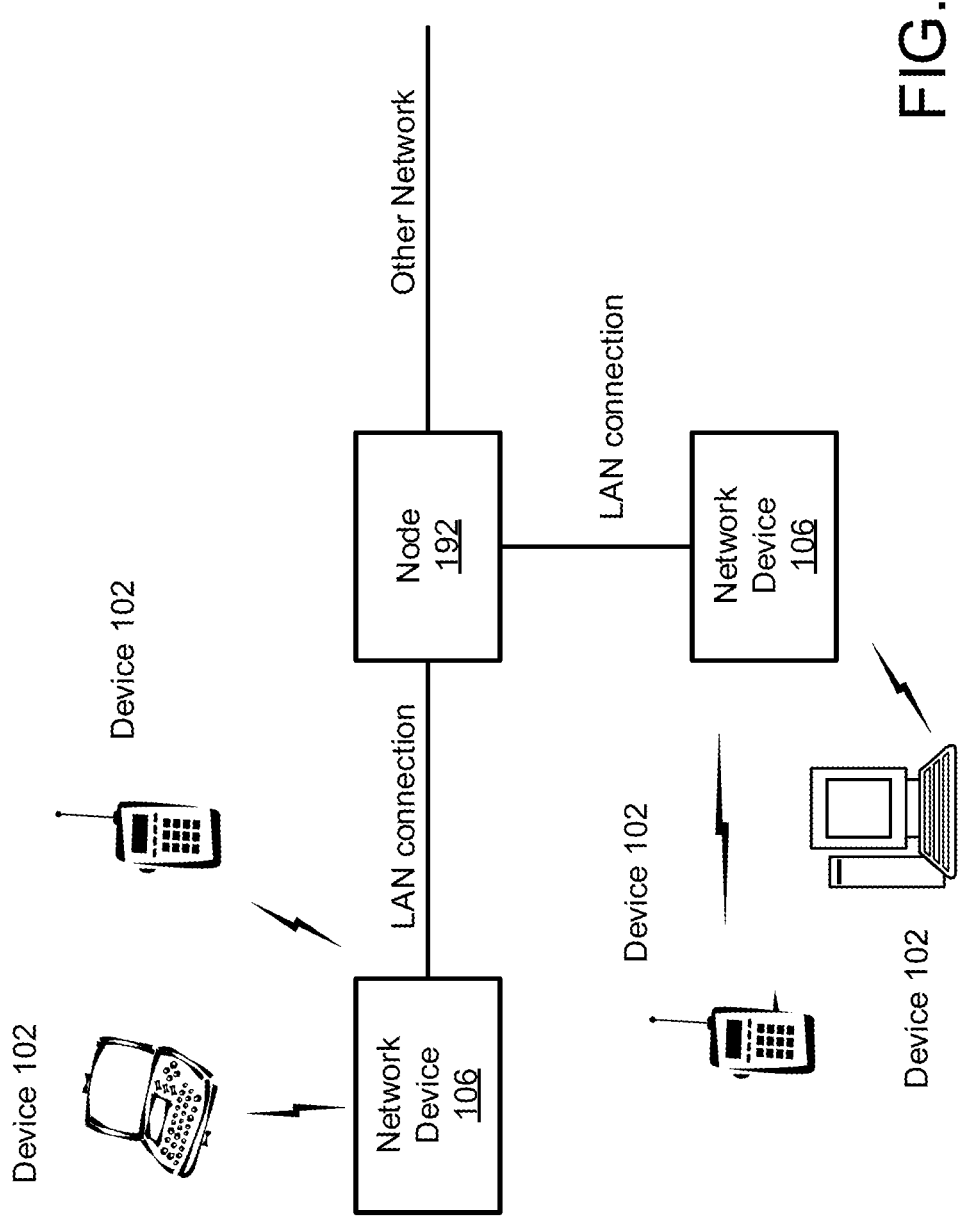
FIG. 1A is a block diagram depicting a network environment including one or more access points in communication with one or more devices or stations, in one or more embodiments.

Prior to discussing specific embodiments of the present solution, it can be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points (APs) 106, one or more wireless communication devices 102 and a network hardware component 192. The wireless communication devices 102 can for example include laptop computers 102, tablets 102, personal computers 102, Internet of Things (IoT) devices 102, and/or cellular telephone devices 102. The details of an embodiment of each wireless communication device 102 and/or AP 106 are described in greater detail with reference to FIGS. 1B and 1C. The network environment can be an ad hoc network environment, an infrastructure wireless network environment, a subnet environment, etc. in one embodiment. The APs 106 can be operably coupled to the network hardware component 192 via local area network connections. The network hardware component 192, which can include a router, gateway, switch, bridge, modem, system controller, appliance, etc., can provide a local area network connection for the communication system. Each of the APs 106 can have an associated antenna or an antenna array to communicate with the wireless communication devices in its area. The wireless communication devices 102 can register with a particular AP 106 to receive services from the communication system (e.g., via a SU-MIMO or MU-MIMO configuration). For direct connections (e.g., point-to-point communications), some wireless communication devices can communicate directly via an allocated channel and communications protocol. Some of the wireless communication devices 102 can be mobile or relatively static with respect to AP 106.

In some embodiments an AP 106 includes a device or module (including a combination of hardware and software) that allows wireless communication devices 102 to connect to a wired network using wireless-fidelity (WiFi), or other standards. An AP 106 can sometimes be referred to as an wireless access point (WAP). An AP 106 can be implemented (e.g., configured, designed and/or built) for operating in a wireless local area network (WLAN). An AP 106 can connect to a router (e.g., via a wired network) as a standalone device in some embodiments. In other embodiments, an AP 106 can be a component of a router. An AP 106 can provide multiple devices access to a network. An AP 106 can, for example, connect to a wired Ethernet connection and provide wireless connections using radio frequency links for other devices 102 to utilize that wired connection. An AP 106 can be implemented to support a standard for sending and receiving data using one or more radio frequencies. Those standards, and the frequencies they use can be defined by the IEEE (e.g., IEEE 802.11 standards). An AP 106 can be configured and/or used to support public Internet hotspots, and/or on a network to extend the network's Wi-Fi signal range.

In some embodiments, the APs 106 can be used for (e.g., in-home or in-building) wireless networks (e.g., IEEE 802.11, Bluetooth, ZigBee, any other type of radio frequency based network protocol and/or variations thereof). Each of the wireless communication devices 102 can include a built-in radio and/or is coupled to a radio. Such wireless communication devices 102 and/or APs 106 can operate in accordance with the various aspects of the disclosure as presented herein to enhance performance, reduce costs and/or size, and/or enhance broadband applications. Each wireless communication device 102 can have the capacity to function as a client node seeking access to resources (e.g., data, and connection to networked nodes such as servers) via one or more APs 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
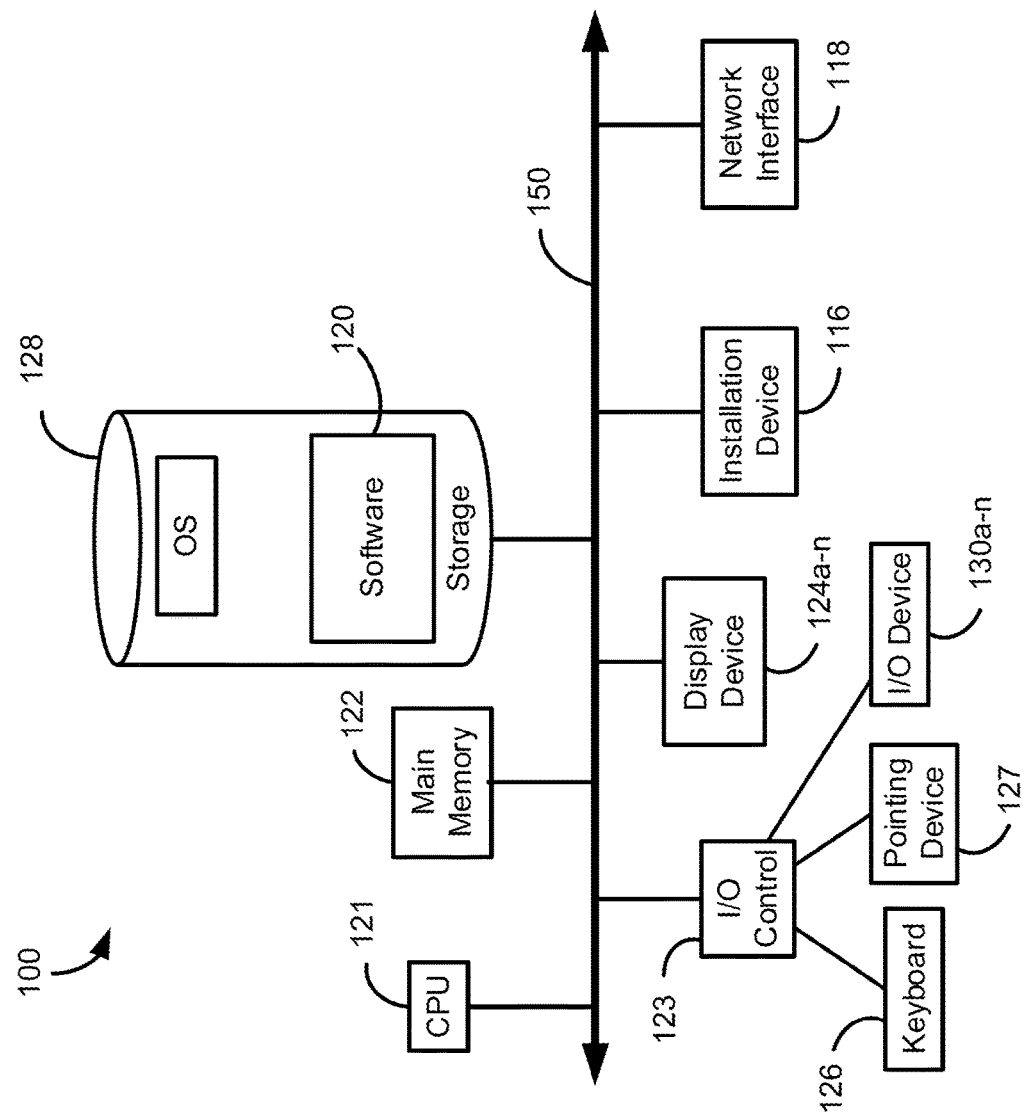
FIGS. 1B and 1C are block diagrams depicting computing devices useful in connection with the methods and systems described herein, in one or more embodiments.
Figure 1C:
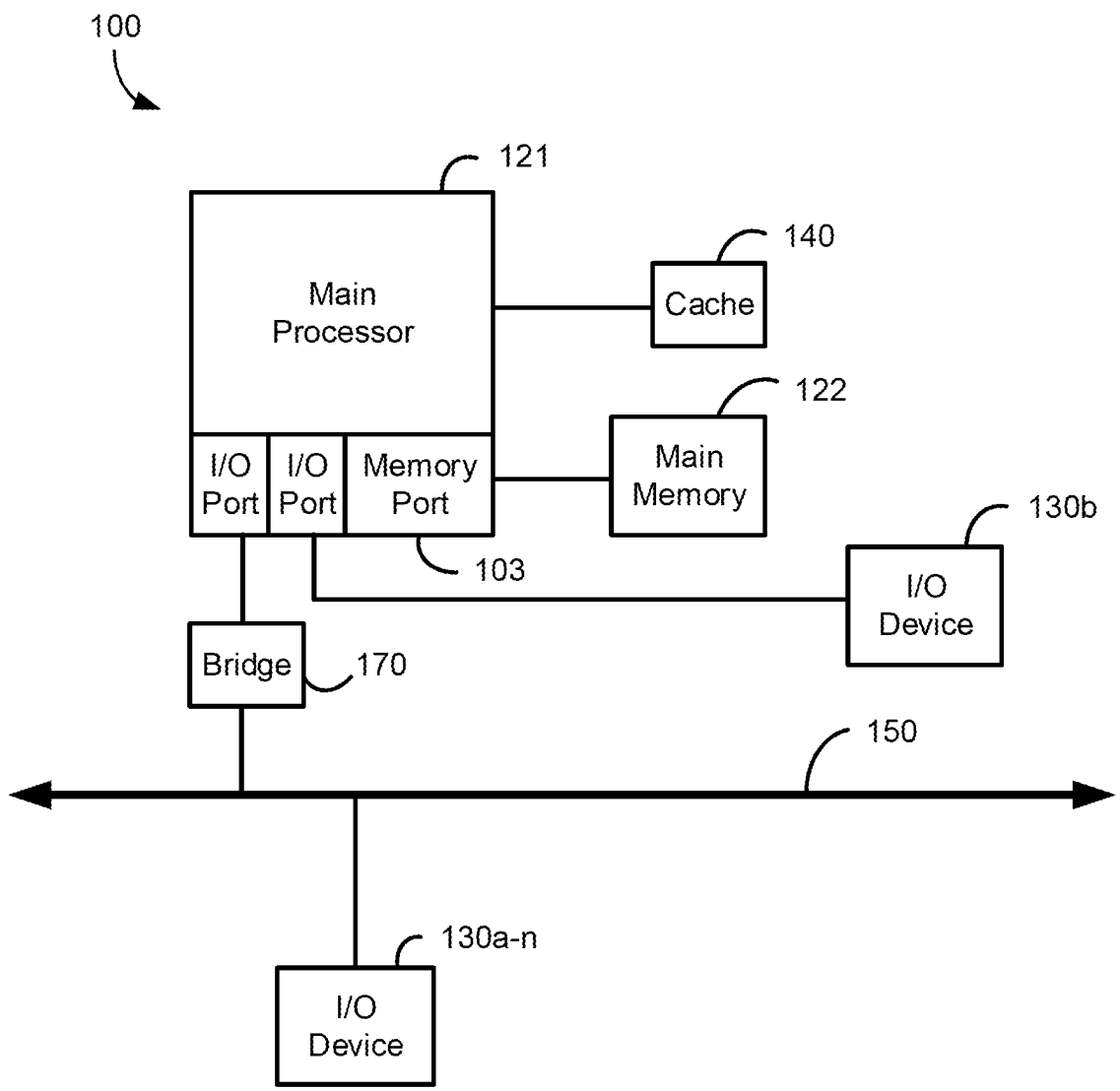

The communications device(s) 102 and access point(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or AP 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include an operating system and/or software. As shown in FIG. 1C, each computing device 100 can also include additional optional elements, such as a memory port 103, a bridge 170, one or more input/output devices 130a-130n, and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Santa Clara, California; those manufactured by International Business Machines of White Plains, New York; or those manufactured by Advanced Micro Devices of Sunnyvale, California. The computing device 100 can be based on any of these processors, or any other processor (e.g., integrated digital signal processor (DSP)) capable of operating as described herein.

Main memory unit 122 can be one or more memory chips capable of storing data and allowing any storage location to be directly accessed by the microprocessor or central processing unit 121, such as any type or variant of Static random access memory (SRAM), Dynamic random access memory (DRAM), Ferroelectric RAM (FRAM), NAND Flash, NOR Flash and Solid State Drives (SSD). The main memory unit 122 can be based on any of the above described memory chips, or any other available memory chips capable of operating as described herein. In the embodiment shown in FIG. 1B, the processor or central processing unit 121 communicates with main memory unit 122 via a system bus 150 (described in more detail below). FIG. 1C depicts an embodiment of a computing device 100 in which the processor communicates directly with main memory unit 122 via a memory port 103. For example, in FIG. 1C the main memory unit 122 can be DRDRAM.

FIG. 1C depicts an embodiment in which the main processor or central processing unit 121 communicates directly with cache memory 140 via a secondary bus, sometimes referred to as a backside bus. In other embodiments, the main processor or central processing unit 121 communicates with cache memory 140 using the system bus 150. Cache memory 140 typically has a faster response time than main memory unit 122 and is provided by, for example, SRAM, BSRAM, or EDRAM. In the embodiment shown in FIG. 1C, the processor or central processing unit 121 communicates with various I/O devices 130 via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor or central processing unit 121 can use an Advanced Graphics Port (AGP) to communicate with the display 124. FIG. 1C depicts an embodiment of a computer device 100 in which the main processor or central processing unit 121 can communicate directly with I/O device 130b, for example via HYPERTRANSPORT, RAPIDIO, or INFINIBAND communications technology. FIG. 1C also depicts an embodiment in which local busses and direct communication are mixed: the processor or central processing unit 121 communicates with I/O device 130a using a local interconnect bus while communicating with I/O device 130b directly.

A wide variety of I/O devices 130a-130n can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium or installation device 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, California.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, IEEE 802.11ax, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be configured for using multiple displays 124a-124n. In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer device 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. In some embodiments, the computing device 100 can have different processors, operating systems, and input devices consistent with the device. For example, in one embodiment, the computing device 100 is a smart phone, mobile device, tablet or personal digital assistant. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Duty Cycle Correction based on Coefficient Calibration

Various embodiments disclosed herein are related to reducing or correcting non-linear interference due to duty cycle error of a transmission path and other techniques for improving signal transmission. In some embodiments, the system measures an interference due to duty-cycle imperfection of a Tx upconverter and the system corrects for the interference by applying a coefficient value to a Tx signal provided to the Tx upconverter. In some embodiments, the coefficient value is determined in a calibration process in which a loopback circuit measures an interference signal due to the duty-cycle imperfection and tunes the coefficient value to reduce the interfere signal. Advantageously, the interference correction may not affect radio frequency (RF) power, may be applied at low frequencies, and may not significantly increase digital power consumption. Moreover, the interference correction uses less power consumption and is less complex than 2-D predistortion techniques used to improve linearity.

Various embodiments disclosed herein are related to reversing an order of Q bits. In some embodiments, the system receives the I bits and Q bits of a Tx signal, reverses an order of the Q bits, and provides the I bits and Q bits to RF digital transmitter cells. Advantageously, the system may reduce a number of RF digital transmitter cells in which both I and Q are active, thereby reducing an impact of duty cycle error. Advantageously, the system may use a Clos network, such as a Benes network, to implement a fully configurable network to route any data bit to any RF digital transmitter cell and to reduce complexity of routing and layout.

Various embodiments disclosed herein are related to intelligently selecting a low-IF transmit path. The low-IF path can be used where one resource unit (RU) or one resource block (RB) is transmitted (e.g., in the 802.11ax standard or in 4G/5G) and/or the RU or RB is at a band edge. Advantageously, by shifting a clock frequency from a channel frequency, interference such as Counter Intermodulation distortion can be intelligently placed outside the band of interest. Advantageously, embodiments disclosed herein may allow for a lower error vector magnitude (EVM) while meeting spectral mask specifications and having lower out-of-band (OOB) interference in the band of interest.

Various embodiments disclosed herein are related to using quadrant dependent/sign-based local oscillator feedthrough (LOFT) cancellation that may improve EVM. In some embodiments, the system selects one of four LOFT calibration coefficient values based on a quadrant that Tx data is in. Advantageously, quadrant dependent LOFT cancellation can reduce or cancel LOFT that appears as modulated distortion over the signal at an output. Moreover, by implementing quadrant dependent LOFT calibration, EVM may be enhanced over a range of power back-off.

Various embodiments disclosed herein are related to controlling transmit power using RF attenuation. In some embodiments, the RF attenuator includes a bank of parallel components which includes a first series switch is in parallel with other paths that include series switches and resistors. In some embodiments, in response to no RF attenuation being indicated, the first switch is turned on. In some embodiments, to attenuate, the first switch is turned off, and attenuation is controlled by selectively turning on the other paths. Advantageously, the RF attenuator can be used for gain reduction once the RF signal level is low enough not to cause any linearity or reliability degradation. Moreover, the RF attenuator can be used in a system that shares a common RF port between an receive (Rx) path and a Tx path. The RF attenuator is applicable to digital Tx and analog Tx implementations.

Various embodiments disclosed herein are related to a communication system. In some embodiments, the system includes a mixer configured to up-convert transmission (Tx) data, a coefficient calibrator configured to select a target value of a coefficient based on a measurement of an interference signal due to non-linearity of the mixer, and an interference canceller coupled to the coefficient calibrator and the mixer. In some embodiments, the interference canceller is configured to generate compensated Tx data based on the Tx data and the selected target value of the coefficient and provide the compensated Tx data to the mixer. In some embodiments, the compensated Tx data corrects for the non-linearity of the mixer.

In some embodiments, the coefficient calibrator is configured to measure a first magnitude of a first interference signal corresponding to a first value of the coefficient. In some embodiments, the first interference signal is due to the non-linearity of the mixer. In some embodiments, the coefficient calibrator is configured to change the coefficient from the first value to a second value and measure a second magnitude of a second interference signal corresponding to the second value. In some embodiments, the second interference signal is due to the non-linearity of the mixer. In some embodiments, the coefficient calibrator is configured to compare the first magnitude and the second magnitude and, in response to the second magnitude exceeding the first magnitude, select the first value as the target value.

In some embodiments, the coefficient calibrator is configured to, in response to the first magnitude exceeding the second magnitude, change the coefficient from the second value to a third value and measure a third magnitude of a third interference signal corresponding to the third value. In some embodiments, the third interference signal is due to the non-linearity of the mixer. In some embodiments, the coefficient calibrator is configured to compare the second magnitude and the third magnitude and, in response to the third magnitude exceeding the second magnitude, select the second value as the target value.

In some embodiments, the coefficient calibrator is configured to generate the compensated Tx data by summing the Tx data and the coefficient. In some embodiments, the coefficient calibrator is configured to correct for duty cycle overlap mismatch of the mixer, according to the selected target value of the coefficient. In some embodiments, the coefficient calibrator is configured to select the target value of the coefficient during startup of the mixer.

In some embodiments, the mixer includes a first output port. In some embodiments, the system further includes a second mixer including a second output port coupled to the first output port of the mixer. In some embodiments, the second mixer is configured to provide a local oscillator feedthrough (LOFT) coefficient to a load of the mixer and the second mixer. In some embodiments, the LOFT coefficient corrects for a LOFT of the Tx data.

In some embodiments, the system further includes a multiplexer configured to receive four local oscillator feedthrough (LOFT) coefficients including the LOFT coefficient, receive a first select bit indicating a first sign of an in-phase portion of the Tx data and a second select bit indicating a second sign of a quadrature portion of the Tx data, and provide, to the mixer, the LOFT coefficient based on the first select bit and the second select bit.

In some embodiments, the mixer has a first input port. In some embodiments, the system further includes a second mixer including a second input port and a first output port coupled to the first input port of the mixer. In some embodiments, the system further includes a switch having a third input port to receive the compensated Tx data, a second output port coupled to the first input port of the mixer, a third output port coupled to the second input port of the second mixer, and a control port. In some embodiments, in response to receiving, at the control port, a control bit having a first state, the switch provides the compensated Tx data to the mixer, and, in response to receiving, at the control port, the control bit having a second state, the switch provides the compensated Tx data to the second mixer. In some embodiments, the switch receives the control bit having the second state in response to the Tx data assigned to one resource unit (RU) located on one of a lowest channel or highest channel of a predetermined band of channels.

Various embodiments disclosed herein are related to a communication system. In some embodiments, the system includes a first mixer cell, a second mixer cell disposed below the first mixer cell along a direction, and a switching network. In some embodiments, the switching network includes a first output port to provide a first in-phase portion of a first Tx data to the first mixer cell, a second output port to provide a second in-phase portion of a second Tx data to the second mixer cell. In some embodiments, the second output port is disposed below the first output port along the direction. In some embodiments, the switching network includes a third output port to provide a first quadrature phase portion of the first Tx data to the second mixer cell and a fourth output port to provide a second quadrature phase portion of the second Tx data to the first mixer cell. In some embodiments, the third output port is disposed below the fourth output port along the direction.

In some embodiments, the switching network includes a first input port to receive the first in-phase portion of the first Tx data and a second input port to receive the second in-phase portion of the second Tx data. In some embodiments, the second input port disposed below the first input port along a direction, In some embodiments, the switching network includes a third input port to receive the first quadrature phase portion of the first Tx data and a fourth input port to receive the second quadrature phase portion of the second Tx data. In some embodiments, the fourth input port is disposed below the third input port along the direction.

In some embodiments, the second input port is disposed between the third input port and the fourth input port. In some embodiments, the second output port is disposed between the third output port and the fourth output port. In some embodiments, the switching network is reconfigurable. In some embodiments, the system further includes a plurality of mixer cells between the first mixer cell and the second mixer cell. In some embodiments, the switching network includes additional output ports between the second output port and the fourth output port, the additional output ports to provide additional Tx data to the plurality of mixer cells.

Various embodiments disclosed herein are related to a communication system. In some embodiments, the system includes an antenna, a receive (Rx) path coupled to the antenna, and a transmit (Tx) path. In some embodiments, the Tx path includes a balun and a radio frequency (RF) attenuator including a first port and a second port. In some embodiments, the balun is coupled to the first port and the antenna coupled to the second port. In some embodiments, the RF attenuator includes a first switch coupled between the first port and the second port and a second switch and a first attenuator coupled to each other in series between the first port and the second port. In some embodiments, the first attenuator has a first attenuator value. In some embodiments, a third switch and a second attenuator are coupled to each other in series between the first port and the second port. In some embodiments, the second attenuator has a second attenuator value greater than the first attenuator value of the first attenuator.

In some embodiments, the first switch has a first control port, the second switch has a second control port, and the third switch has a third control port. In some embodiments, in response to receiving, at the first control port, a first control signal in a first state, the RF attenuator is configured to provide, via the first switch, a Tx signal from the Tx path to the antenna to attenuate the Tx signal by a first attenuation value. In some embodiments, in response to receiving, at the first control port, the first control signal in a second state, and, at the second control port, a second control signal in a third state, the RF attenuator is configured to provide, via the second switch, the Tx signal from the Tx path to the antenna to attenuate the Tx signal by a second attenuation value, wherein the second attenuation value is greater than the first attenuation value.

In some embodiments, the Rx path includes a matching network having i) a first input port coupled to the antenna and ii) a first output port, a shunt switch having i) a second input port coupled to the first output port of the matching network, ii) a second output port coupled to ground, and iii) a control port, and an amplifier coupled to the first output port of the matching network.

In some embodiments, the first switch has a second control port. In some embodiments, in response to receiving, at the control port of the shunt switch, a first control bit in a first state, the shunt switch is configured to couple the first output port of the matching network to the ground to attenuate an Rx signal on the Rx path by a first attenuation value. In some embodiments, in response to receiving, at the second control port of the first switch, a second control bit in a second state, the RF attenuator is configured to provide a Tx signal from the Tx path to the antenna, via the first switch, to attenuate the Tx signal by a second attenuation value. In some embodiments, the second attenuation value is less than the first attenuation value.

In some embodiments, in response receiving, at the control port of the shunt switch, the first control signal in a third state, the shunt switch is configured to decouple the first output port of the matching network from the ground to attenuate a second Rx signal on the Rx path by a third attenuation value. In some embodiments, in response receiving, at the second control port of the first switch, the second control signal in a fourth state, the RF attenuator is configured to decouple the Tx path from the antenna.

Figure 2:
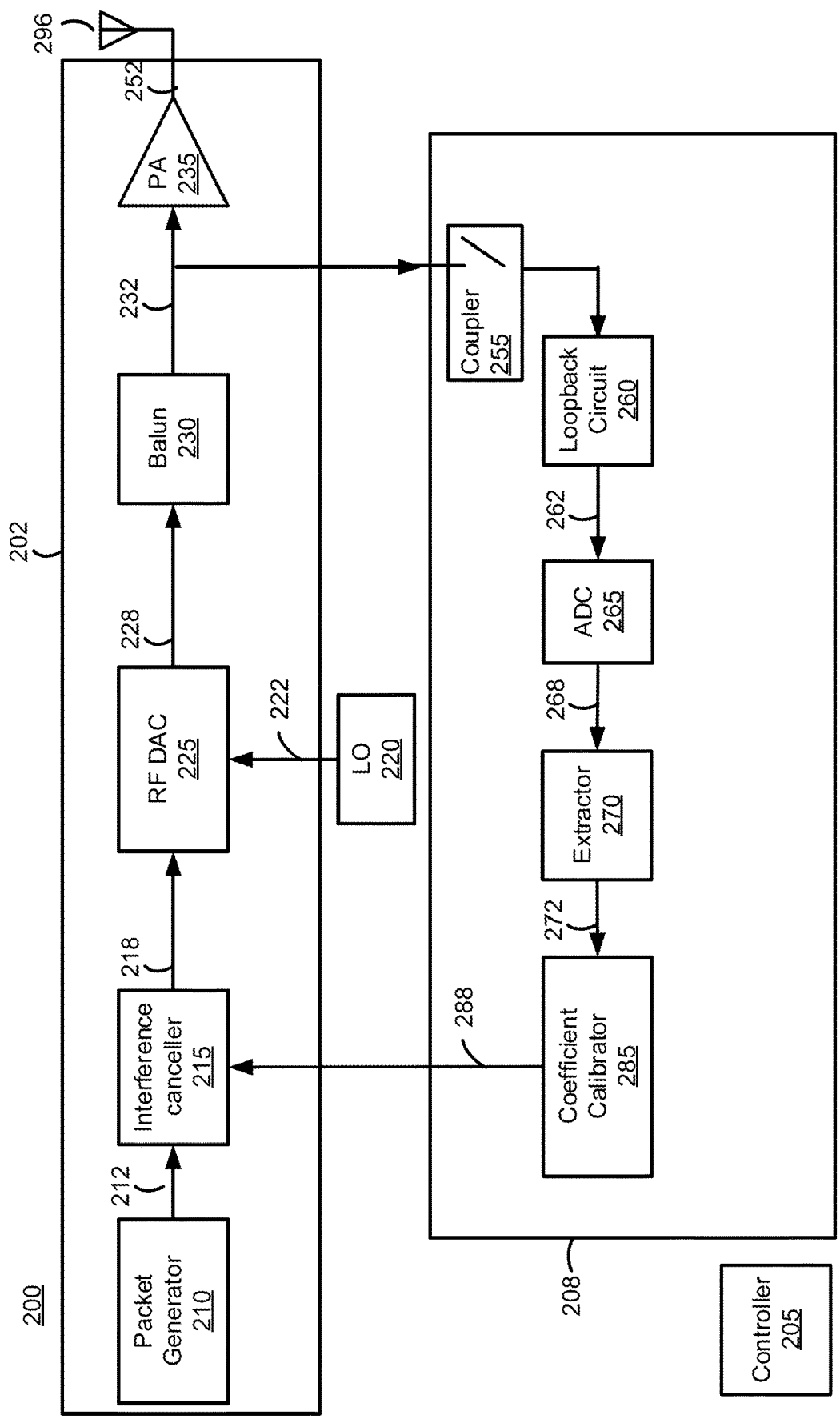
FIG. 2 is a block diagram depicting a communication system, in one or more embodiments.

Referring to FIG. 2, illustrated is a block diagram depicting a communication system 200, in one or more embodiments. In some embodiments, the communication system 200 includes an antenna 296, transmission circuitry 202 (also referred to as "a transmission chain 202"), a controller 205, a local oscillator (LO) 220, and correction circuitry 208. In some embodiments, the transmission circuitry 202 is configured to provide data to the antenna 296 for transmission. In some embodiments, the correction circuitry 208 is configured to couple an output of the transmission circuitry 202 to at least one input of the transmission circuitry 202. In some embodiments, the correction circuitry 208 is configured to detect one or more interference signals from the transmission circuitry 202 due to non-linearity, and generate a coefficient 288 in order to correct the non-linearity. In some embodiments, the transmission circuitry 202 includes a packet generator 210, an interference canceller 215, a radio frequency (RF) digital transmitter 225, a balun 230, and a power amplifier (PA) 235. In some embodiments, the correction circuitry 208 includes a coupler 255, a loopback circuit 260, an analog to digital converter (ADC) 265, an extractor 270, and a coefficient calibrator 285. In some embodiments, these components are implemented as hardware, software, or a combination of them. In some implementations, these components are implemented on an application specific integrated circuit (ASIC), a field programmable gate logic (FPGA) or a combination of them. In some embodiments, the communication system 200 includes more, fewer, or different components than shown in FIG. 2. In some embodiments, the components 205, 210, 215, 225, 270, 285 fare implemented as digital circuits, and the components 220, 225, 230, 235, 255, 260, 265 are implemented as analog circuits, or a combination of analog circuit and digital circuits. In other embodiments, some or all of the components 205, 210, 215, 220, 225, 270, 280, 285 are implemented as analog circuits, the RF digital transmitter 225 (also may be referred to as "RF DAC 225") is replaced by an analog up-converter, and the ADC 265 can be omitted or implemented at different locations.

In one aspect, non-linearity compensation is performed through two time periods: a calibration period, and a transmission period. In some embodiments, the calibration period is during a startup time of the communication system 200.

In some embodiments, the packet generator 210 is a component that generates a packet 212 for transmission. In one implementation, the packet generator 210 is implemented as a digital logic circuit. In one configuration, the packet generator 210 includes an output port coupled to an input port of the interference canceller 215. In one approach, the packet generator 210 generates one or more packets 212 including transmit (Tx) data, random data, or test data including a predetermined pattern, for example, during the calibration period. In one approach, the packet generator 210 generates one or more packets 212 including content data corresponding to a target baseband signal for transmission in a digital representation. In one configuration, the packet generator 210 provides the packet 212 to the interference canceller 215, for example, in the digital representation.

In some embodiments, the interference canceller 215 is a component that receives the packet 212, receives the coefficient 288, and based on the packet 212 and the coefficient 288, generates a compensated packet 218 including compensated (Tx) data. In some embodiments, the compensated packet 218 corresponds to a non-linearity compensated baseband signal in the digital representation. In some embodiments, the interference canceller 215 compensates for third order counter intermodulation (CIM3) distortion generated due to duty cycle overlap mismatch (e.g., duty cycle error) of in-phase portion and a quadrature portion. In one aspect, the interference canceller 215 compensates for higher order counter intermodulation distortion. In one implementation, the interference canceller 215 is implemented as a digital logic circuit. In one configuration, the interference canceller 215 includes a first input port, a second input port, and an output port. In one configuration, the first input port of the interference canceller 215 is coupled to the output port of the packet generator 210 and the second input port of the interference canceller 215 is coupled to an output port of the coefficient calibrator 285. In one configuration, the output port of the interference canceller 215 is coupled to an input port of the RF digital transmitter 225. In one approach, the interference canceller 215 receives one or more parameters for performing non-linearity (e.g., due to duty cycle overlap mismatch) compensation from the coefficient calibrator 285, and performs non-linearity compensation according to the received parameters. In some embodiments, the one or more parameters indicate or correspond to at least one coefficient to alter an amplitude, delay amount or a combination of them for at least one portion of data in the packet 212. In one implantation, the interference canceller 215 provides the compensated packet 218 corresponding to the compensated baseband signal in the digital representation to RF digital transmitter 225.

In some embodiments, the interference canceller 215 sums the packet 212 and the coefficient 288 to generate the compensated packet 218. In one embodiment, the interference canceller 215 generates the compensated packet 218 according to the following equation:

$$I_{out}[n] = I_{in}[n] + x \cdot \text{sgn}(I_{in}[n]) \cdot \min(|I_{in}[n]|, |Q_{in}[n]|), \text{ and}$$

$$Q_{out}[n] = Q_{in}[n] + x \cdot \text{sgn}(Q_{in}[n]) \cdot \min(|I_{in}[n]|, |Q_{in}[n]|),$$

where n corresponds to a time that a data bit of the packet 212 is sampled, $I_{in}[n]$ corresponds to an in-phase (I) data bit (e.g., data sample, time sample) of the packet 212, $Q_{in}[n]$ corresponds to a quadrature (Q) data bit of the packet 212, x corresponds to the coefficient 288, $I_{out}[n]$ corresponds to an I data bit of the compensated packet 218, $Q_{out}[n]$ corresponds to a Q data bit of the compensated packet 218, $\text{sgn}(I_{in}[n])$ corresponds to a sign (e.g., polarity) of $I_{in}[n]$, $I_{in}[n]$ I corresponds to a magnitude operation of $I_{in}[n]$, and $\min(|I_{in}[n]|, |Q_{in}[n]|)$ corresponds to a minimum magnitude of $I_{in}[n]$ and $Q_{in}[n]$.

In some embodiments, LO 220 is a component that generates an LO signal 222. In some embodiments, the LO signal 222 is used to up-convert the packet 212. In some embodiments, the LO 220 includes one or more of a synthesizer, a divider, or an LO buffer. In one configuration, the LO 220 includes an output port that provides the LO signal 222 to the RF digital transmitter 225.

In some embodiments, the RF digital transmitter 225 is a component that converts the compensated packet 218 in the digital representation into an analog representation to generate a transmit RF signal 228. In some embodiments, the RF digital transmitter 225 may be replaced by an analog transmitter 225. In one implementation, the RF digital transmitter 225 is implemented as an analog circuit or a mixed signal circuit. In one implementation, the RF digital transmitter 225 is implemented as one or more switched capacitors. In one aspect, the transmit RF signal 228 indicates, in the analog representation, the compensated packet 218 from the interference canceller 215 for transmission through the balun 230. In one configuration, the RF digital transmitter 225 includes a first input port coupled to the output port of the interference canceller 215, a second input port coupled to the output port of the LO 220 and an output port coupled to a port of the balun 230. In one configuration, the RF digital transmitter 225 provides the transmit RF signal 228 to the balun 230.

In one configuration, the RF digital transmitter 225 includes an upconverter (e.g., mixer) that upconverts the compensated packet 218 by modulating the compensated packet 218 with the LO signal 222 provided by the LO 220 to generate the transmit RF signal 228. In one aspect, the upconverter upconverts the compensated packet 218 at a baseband frequency (e.g., between DC and a few hundred MHz) to generate the transmit RF signal 228 at RF (e.g., over 1 GHz). In one aspect, the upconverter upconverts a digital representation of the compensated packet 218. In one implementation, the upconverter upconverts the compensated packet 218 in a voltage domain. In one implementation, an output of the upconverter is coupled to an input of the one or more switched capacitors for converting the digital representation into the analog representation to generate a transmit RF signal 228.

In some embodiments, the balun 230 receives the transmit RF signal 228. In some embodiments, the balun 230 generates a converted RF signal 232 based on the transmit RF signal 228. In one configuration, the balun 230 includes an input port coupled to the output port of the RF digital transmitter 225 and an output port. In this configuration, the balun 230 may perform impedance transformation, such that output of the balun 230 may have, for example, 50Ω impedance to drive the subsequent component (e.g., power amplifier 235 or antenna 296).

In some embodiments, the power amplifier 235 is a component that amplifies the converted RF signal 232 for transmission. In one implementation, the power amplifier 235 is implemented as an analog circuit. In one configuration, the power amplifier 235 includes an input port coupled to the output port of the balun 230 and an output port coupled to an antenna 296. The power amplifier 235 may amplify the converted RF signal 232 and transmit the amplified RF signal through an antenna 296 for communicating with another communication system. In some embodiments, the components 205, 210, 215, 220, 225, 230, 255, 260, 265, 270, and 285 are implemented on a single integrated circuit (e.g., a system on chip), where the power amplifier 235 is implemented on a separate integrated circuit. In some embodiments, the input port of the power amplifier 235 is coupled to the output port of the balun 230 through a transmission path. In one implementation, the transmission path includes a conductive material and is sized or has a dimension to allow the transmit RF signal 228 at the RF to be propagated to the power amplifier 235. The power amplifier 235 may amplify the transmit RF signal 228 and transmit the amplified transmit RF signal through an antenna 296 for communicating with another communication system. In some embodiments, the power amplifier 235 is omitted, and the antenna 296 is coupled to the output of the balun 230.

In some embodiments, the coupler 255 is a component that selectively couples or decouples the output port of the balun 230 to an input port of the loopback circuit 260, for example, according to a control signal or an instruction from the controller 205. In one implementation, the coupler 255 includes an input port coupled to the output port of the balun 230 and an output port coupled to the input port of the loopback circuit 260. In some embodiments, the coupler 255 includes a switch (e.g., RF switch) that selectively couples or decouples the output port of the balun 230 to the input port of the loopback circuit 260 according to the control signal from the controller 205. For example, the switch is turned off or disabled to decouple the output port of the balun 230 from the input port of the loopback circuit 260 during the transmission period. For another example, the switch is turned on or enabled to couple the output port of the power amplifier 235 to the input port of the loopback circuit 260 during the calibration period. In some embodiments, the coupler 255 includes a filter and/or an attenuator coupled to the switch. The attenuator may attenuate a signal output at the output port of the power amplifier 235, for example, by between 20 and 40 dB to protect the loopback circuit 260 from being damaged.

In some embodiments, the loopback circuit 260 is a component that detects or receives the converted RF signal 232 at its input port, and generates a receive baseband signal 262. In one aspect, the converted RF signal 232 received during the calibration period includes one or more interference signals. In one implementation, the loopback circuit 260 is implemented as an analog circuit. In one configuration, the loopback circuit 260 includes a low noise amplifier (LNA) that amplifies the converted RF signal 232 received through the coupler 255. In one configuration, the loopback circuit 260 includes a downconverter that downconverts a signal received at the output port of the LNA at the RF to generate the receive baseband signal 262 at the baseband frequency. In one configuration, the loopback circuit 260 includes a filter that filters out Tx signals and provides the one or more interference signals. In one implementation, the loopback circuit 260 shares one or more components (e.g., LNA, downconverter, filter, or a local oscillator) of a receiver (not shown). In one configuration, the loopback circuit 260 provides the receive baseband signal 262 to the ADC 265.

In some embodiments, the ADC 265 is a component that converts the receive baseband signal 262 in the analog representation into the digital representation to generate a receive baseband data 268. In one implementation, the ADC 265 is implemented as an analog circuit or a mixed signal circuit. In one aspect, the receive baseband data 268 indicates or represents, in the digital representation, the receive baseband signal 262 from the loopback circuit 260 for determining interference and non-linearity. In one configuration, the ADC 265 includes an input port coupled to the output port of the loopback circuit 260 and an output port coupled to an input port of an extractor 270. In one configuration, the ADC 265 provides the receive baseband data 268 to the extractor 270.

In some embodiments, the extractor 270 is a component that obtains, detects, or extracts a representation of a magnitude of the one or more interference signals 272 from the receive baseband data 268. In one implementation, the extractor 270 is implemented as a digital logic circuit. In one configuration, the extractor 270 includes an input port coupled to an output port of the ADC 265 and an output port coupled to an input port of the coefficient calibrator 285. In one approach, during the calibration period, the extractor 270 detects the magnitude of the one or more interference signals 272 by measuring an energy level of a frequency range in which the one or more interference signals 272 are located. In one configuration, the extractor 270 provides the magnitude of the one or more interference signals 272 as a digital representation (e.g., one or more bits).

In some embodiments, the coefficient calibrator 285 is a component that determines a change in the magnitude of the one or more interference signals 272, and determines or adjusts a coefficient 288 for performing non-linearity compensation accordingly. In one implementation, the coefficient calibrator 285 is implemented as a digital logic circuit. In one configuration, the coefficient calibrator 285 includes an input port coupled to the output port of the extractor 270, and an output port coupled to an input port of the interference canceller 215. In one implementation, the coefficient calibrator 285 provides the coefficient 288 to the interference canceller 215. In one configuration, during the calibration period, the coefficient calibrator 285 provides the coefficient 288 having a first value to the interference canceller 215. In one configuration, the coefficient calibrator 285 measures a first magnitude of a first interference signal based on the first value of the coefficient 288. In one configuration, the coefficient calibrator 285 changes the coefficient 288 from the first value to a second value and provides the coefficient 288 having the second value to the interference canceller 215. In one configuration, the coefficient calibrator 285 measures a second magnitude of a second interference signal based on the second value of the coefficient 288. In one configuration, the coefficient calibrator 285 compares the first magnitude and the second magnitude. In one configuration, in response to the second magnitude exceeding the first magnitude, the coefficient calibrator 285 selects the first value as the target value and provides the coefficient 288 having the target value to the interference canceller 215 for modifying or adjusting the packet 212 during the transmission period. In one configuration, in response to the second magnitude being less than the first magnitude, the coefficient calibrator 285 obtains additional measurements of additional interference signals.

In some embodiments, the controller 205 is a component that configures various components of the system 200 for performing calibration of the coefficient 288. In one implementation, the controller 205 is implemented as a digital logic circuit, a state machine, software executing on a processor, a firmware, a digital signal processor, etc. In one implementation, the controller 205 is implemented as a processor that executes instructions to perform various processes for performing coefficient calibration disclosed herein. In some embodiments, during the transmission period, the controller 205 disables or turns off the coupler 255, while the balun 230 outputs the converted RF signal 232. In some embodiments, during the calibration period, the controller 205 enables or turns on the coupler 255, while the balun 230 transmits or outputs a second transmit RF signal 228 and the power amplifier 235 amplifies the second transmit RF signal 228 to generate an amplified transmit RF signal 252.

Figure 3:
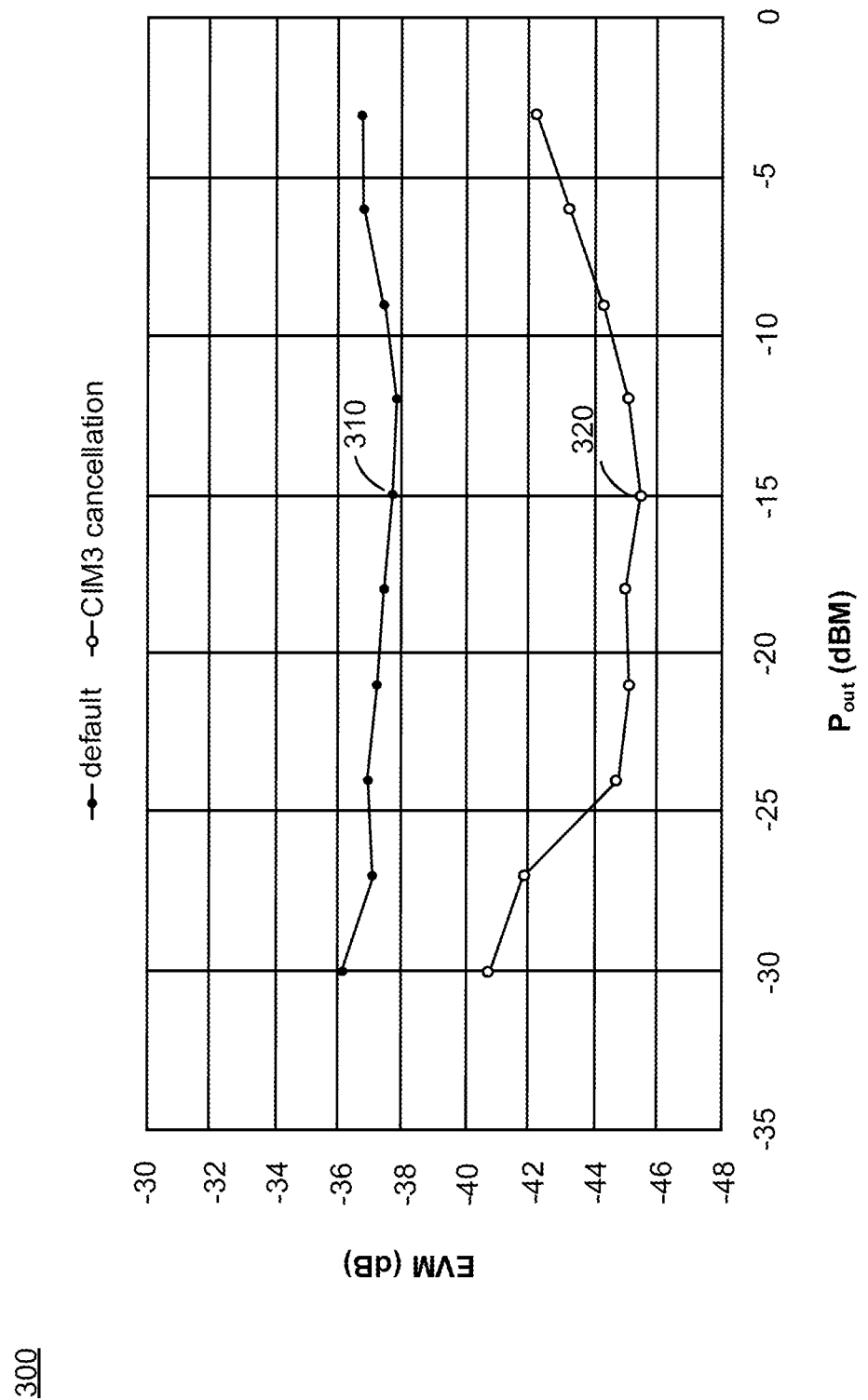
FIG. 3 is a plot showing an improvement in linearity, in one or more embodiments.

Referring to FIG. 3 is a plot 300 showing an improvement in linearity, in one or more embodiments. In FIG. 3, X-Axis represents an amplitude (or magnitude or power), in dBm, of a converted RF signal 232, and Y-Axis represents an error vector magnitude (EVM), in dB, of the converted RF signal 232, in which EVM indicates linearity performance. The line 310 shows the EVM of the converted RF signal 232 without the disclosed embodiments, and the line 320 shows the EMV of the converted RF signal 232 of some embodiments of the disclosure. Advantageously, embodiments of the disclosure improve linearity and reduce the EVM by at least 4 dB to 6 dB across the range of amplitudes.

Figure 4:
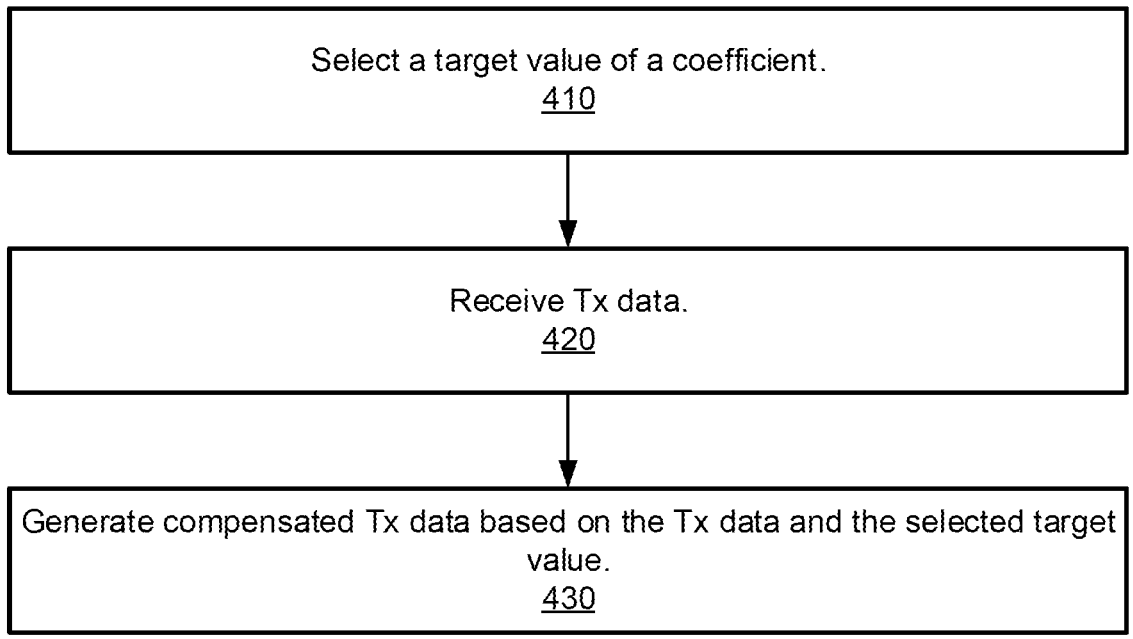
FIG. 4 is a flow chart depicting a process of generating compensated Tx data, in one or more embodiments.

Referring to FIG. 4, illustrated is a flow chart depicting a process 400 of generating compensated Tx data, in one or more embodiments. In some embodiments, the process 400 is performed by the system 200 shown in FIG. 2. In other embodiments, the process 400 is performed by other entities. In some embodiments, the process 400 includes more, fewer, or different operations than shown in FIG. 4.

At operation 410, the system 200 selects a target value of a coefficient. In some embodiments, the target value of the coefficient is based on a measurement of an interference signal due to non-linearity of a mixer of the RF digital transmitter 225. In some embodiments, the target value is selected during a calibration period (e.g., during startup of one or more components of the system). Detailed description on the calibration process is provided below with respect to FIG. 5.

At operation 420, the system 200 receives Tx data. In some embodiments, the Tx data is one or more bits of a packet. In some embodiments, the Tx data is for communicating with another communication system.

At operation 430, the system 200 generates compensated Tx data based on the Tx data and the selected target value of the coefficient. In some embodiments, the system 200 generates the compensated TX data by summing the Tx data and the coefficient. In some embodiments, the system 200 provides the compensated TX data to the mixer. In some embodiments, the compensated TX data corrects for the non-linearity of the mixer. In some embodiments, the compensated TX data corrects for duty cycle overlap mismatch of the mixer, according to the selected target value of the coefficient.

Figure 5:
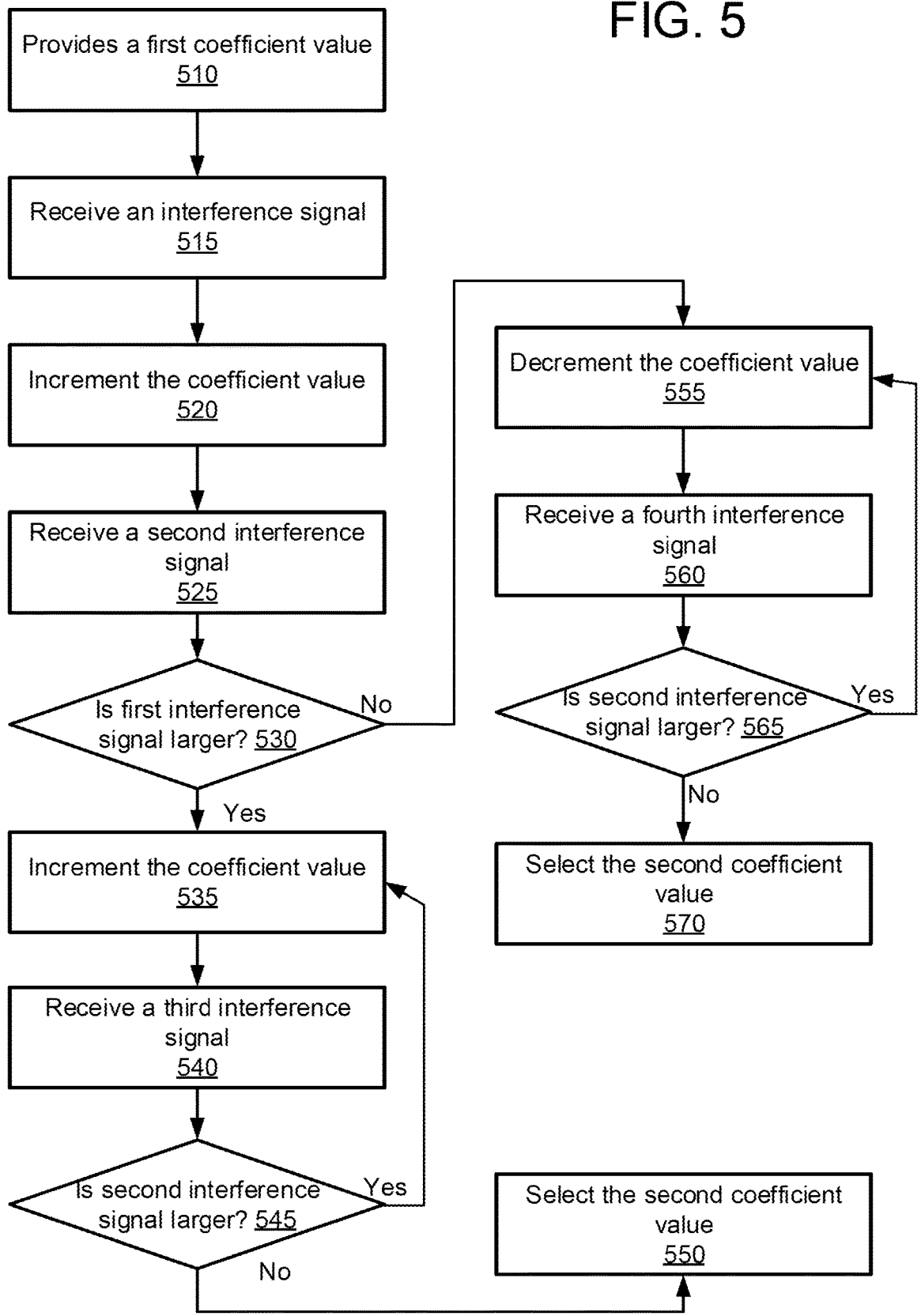
FIG. 5 is a flow chart depicting a process of calibrating to select a target value for a coefficient, in one or more embodiments.

Referring to FIG. 5, illustrated is a flow chart depicting a process 500 of calibrating to select a target value for a coefficient, in one or more embodiments. In some embodiments, the process 500 is performed by the system 200 shown in FIG. 2. In other embodiments, the process 500 is performed by other entities. In some embodiments, the process 500 includes more, fewer, or different steps than shown in FIG. 5. In some embodiments, one or more operations of the process 500 can be combined with one or more operations of the process 400 of FIG. 4.

At operation 510, the system 200 may provide a first coefficient value. In some embodiments, the system 200 generates first compensated test data at a baseband frequency based on the first coefficient value and test data of a packet, for example according to the equation above described with respect to FIG. 2. At operation 515, the system 200 receives (e.g., detects) an interference signal. In some embodiments, the interference signal is included in the transmit RF signal 228 or in the converted RF signal 232 at RF generated based on the first compensated test data. At operation 520, the system 200 may increment the coefficient value to generate a second coefficient value. In some embodiments, the system 200 generates second compensated test data at the baseband frequency based on the second coefficient value and the test data, for example according to the equation above described with respect to FIG. 2. At operation 525, the system 200 may receive a second interference signal. In some embodiments, the second interference signal is included in the transmit RF signal 228 or in the converted RF signal 232 at RF generated based on the second compensated test data.

At operation 530, the system 200 may determine whether a first magnitude of the first interference signal is larger than a second magnitude of the second interference signal. In response to the system 200 determining that the first magnitude of the first interference signal is larger than the second magnitude of the second interference signal, at operation 535, the system 200 may increment the second coefficient value to generate a third coefficient value. In some embodiments, the system 200 may generate third compensated test data at the baseband frequency based on the third coefficient value and the test data, for example according to the equation above described with respect to FIG. 2. At operation 540, the system 200 may receive a third interference signal. In some embodiments, the third interference signal is included in the transmit RF signal 228 or in the converted RF signal 232 generated based on the third compensated test data.

At operation 545, the system 200 may determine whether the second magnitude of the second interference signal is larger than a third magnitude of the third interference signal. In response to the system 200 determining that the second magnitude of the second interference signal is not larger than the third magnitude of the third interference signal, at operation 550, the system 200 may select the second coefficient value as a target coefficient value. In some embodiments, the system 200 may generate compensated Tx data based on the target coefficient value and Tx data. In response to the system 200 determining that the second magnitude of the second interference signal is larger than the third magnitude of the third interference signal, the system 200 may perform operation 535.

In response to the system 200 determining that the first magnitude of the first interference signal is not larger than the second magnitude of the second interference signal, then at operation 555, the system 200 may decrement the second coefficient value. In some embodiments, the system 200 may generate fourth compensated test data at the baseband frequency based on the fourth coefficient value and the test data, for example according to the equation above described with respect to FIG. 2. At operation 560, the system 200 may receive a fourth interference signal. In some embodiments, the fourth interference signal is included in the transmit RF signal 228 or in the converted RF signal 232 generated based on the fourth compensated test data. At operation 565, the system 200 determines whether the second magnitude of the second interference signal is larger than a fourth magnitude of the fourth interference signal. In response to the system 200 determining that the second magnitude of the second interference signal is not larger than the fourth magnitude of the fourth interference signal, then at operation 570, the system 200 may select the second coefficient value as a target coefficient value. In response to the system 200 determining that the second magnitude of the second interference signal is larger than the fourth magnitude of the fourth interference signal, the system 200 may perform operation 555.

Figure 6:
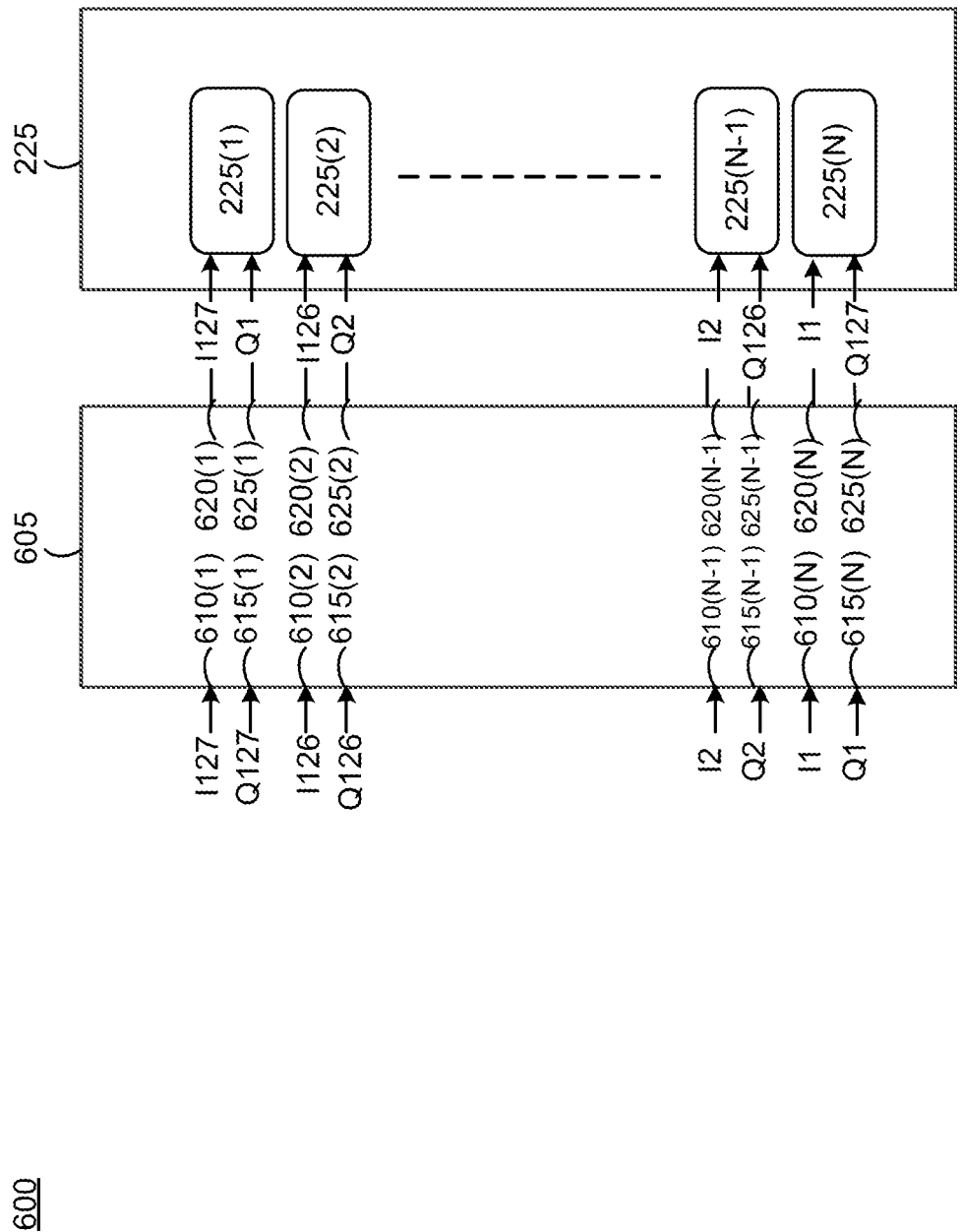
FIG. 6 is a block diagram of a communication system, in accordance with one or more embodiments.

Referring now to FIG. 6, a block diagram of a communication system 600 is shown, in accordance with one or more embodiments. The communication system 600 may be part of the system 200 of FIG. 2. The system 600 includes one or more switching networks 605 that may be configured to swap or reverse an order (e.g., mapping) of Q data bits of the packet 212 or the compensated packet 218. The one or more switching network 605 may be disposed between the interference canceller 215 and the RF digital transmitter 225. For simplicity, the remainder of the discussion refers to the packet 212. The one or more switching networks 605 may include a first switching network for I data bits (e.g., thermometer-coded I data bits, binary-coded I bits, or a combination thereof) and a second switching network for Q data bits (e.g., thermometer-coded Q data bits, binary-coded Q bits, or a combination thereof). In one implementation, the one or more switching networks include at least one of one or more multistage networks, one or more Clos networks, or one or more Benes networks. In some embodiments, the one or more switching networks are reconfigurable. For example, based on a first state, the one or more switching networks can reverse the order of the Q data bits, and based on a second state, the one or more switching networks can maintain the order of the Q data bits.

In some embodiments, the one or more switching networks 605 include N input ports 610 for receiving I data in a first order. For simplicity, input ports 610(1), 610(2), 610(N−1), and 610(N) are shown. In one configuration, the input port 610(1) receives I data bit I127, the input port 610(2) receives I data bit I126, the input port 610(N−1) receives I data bit I2, and the input port 610(N) receives I data bit I1.

In some embodiments, the one or more switching networks 605 include N input ports 615 for receiving Q data in a second order. For simplicity, input ports 615(1), 615(2), 615(N−1), and 615(N) are shown. In one configuration, the input port 615(1) receives Q data bit Q127, the input port 615(2) receives Q data bit Q126, the input port 615(N−1) receives Q data bit Q2, and the input port 615(N) receives Q data bit Q1. In one implementation, each input port 615(X) is disposed below its preceding input port 615(X−1). In some embodiments, the I and Q input ports are interleaved. In one aspect, the input port 615(1) is disposed below the input port 610(1), the input port 615(2) is disposed below the input port 610(2), the input port 615(N−1) is disposed below the input port 610(N−1), and the input port 615(N) is disposed below the input port 610(N).

In some embodiments, the one or more switching networks 605 include N output ports 620 for providing I data in a third order (e.g., a same order as the first order). For simplicity, output ports 620(1), 620(2), 620(N−1), and 620(N) are shown. In one configuration, the output port 620(1) provides the I data bit I127, the output port 620(2) provides the I data bit I126, the output port 620(N−1) provides the I data bit I2, and the output port 620(N) provides the I data bit I1. In one implementation, each output port 620(X) is disposed below its preceding output port 620(X−1).

In some embodiments, the one or more switching networks 605 include N output ports 625 for providing Q data in a fourth order (e.g., a reverse order of the second order). For simplicity, output ports 625(1), 625(2), 625(N−1), and 625(N) are shown. In one configuration, the output port 625(1) provides the Q data bit Q1, the output port 625(2) provides the Q data bit Q2, the output port 625(N−1) provides the Q data bit Q126, and the output port 625(N) provides the Q data bit Q127. In one implementation, each output port 625(X) is disposed below its preceding output port 625(X−1). In some embodiments, the I and Q output ports are interleaved. In one aspect, the output port 625(1) is disposed below the output port 620(1), the output port 625(2) is disposed below the output port 620(2), the output port 625(N−1) is disposed below the output port 620(N−1), and the output port 625(N) is disposed below the output port 620(N).

In some embodiments, the system 600 includes the RF digital transmitter 225 of FIG. 2. The RF digital transmitter 225 may include N number of RF digital transmitter cells (e.g., mixer cells). For simplicity, RF digital transmitter cells 225(1), 225(2), 225(N−1), and 225(N) are shown. In some embodiments, a RF digital transmitter cell is an instance of the RF digital transmitter 225 that receives one I data bit and one Q data bit of the packet 212 or the compensated packet 218. For example, the RF digital transmitter cell 225(1) is coupled to the output port 620(1) of the one or more switching networks 605 to receive the I data bit I127 and the output port 625(1) of the one or more switching networks 605 to receive the Q data bit Q1. For example, the RF digital transmitter cell 225(2) is coupled to the output port 620(2) of the one or more switching networks 605 to receive the I data bit I126 and the output port 625(2) of the one or more switching networks 605 to receive the Q data bit Q2. For example, the RF digital transmitter cell 225(N−1) is coupled to the output port 620(N−1) of the one or more switching networks 605 to receive the I data bit I2 and the output port 625(N−1) of the one or more switching networks 605 to receive the Q data bit Q126. For example, and the RF digital transmitter cell 225(N) is coupled to the output port 620(N) of the one or more switching networks 605 to receive the I data bit I1 and the output port 625(N) of the one or more switching networks 605 to receive the Q data bit Q127. In some embodiments, each of the RF digital transmitter cells 225(1), 225(2), 225(N−1), and 225(N) may include an RF digital transmitter cell for an I data bit and an RF digital transmitter cell for a Q data bit.

In some embodiments, communication system 600 applies to thermometer-coded bits, but not binary-coded bits. In one configuration, the thermometer-coded Q data bits are reversed, but the binary-coded Q bits are not reversed. In one configuration, the one or more switching networks 605 receive the binary-coded bits and provide the binary-coded bits in the order received. In another configuration, the RF digital transmitter cells 225 receive the binary-coded bits, which bypass the one or more switching networks 605. In one example, each sample is represented with N (e.g., 13) bits that are divided into a thermometer-coded section of M (e.g., 5) bits, a binary-coded section (e.g., 7 bits), and a sign bit. The thermometer-coded section of M bits can be implemented as 2^M−1 unary cells. The reverse mapping may only apply to the 2^M−1 unary cells. In some embodiments, the communication system 600 does not apply to binary-coded bits to avoid I/Q overlap which causes nonlinearity.

Figure 7A:
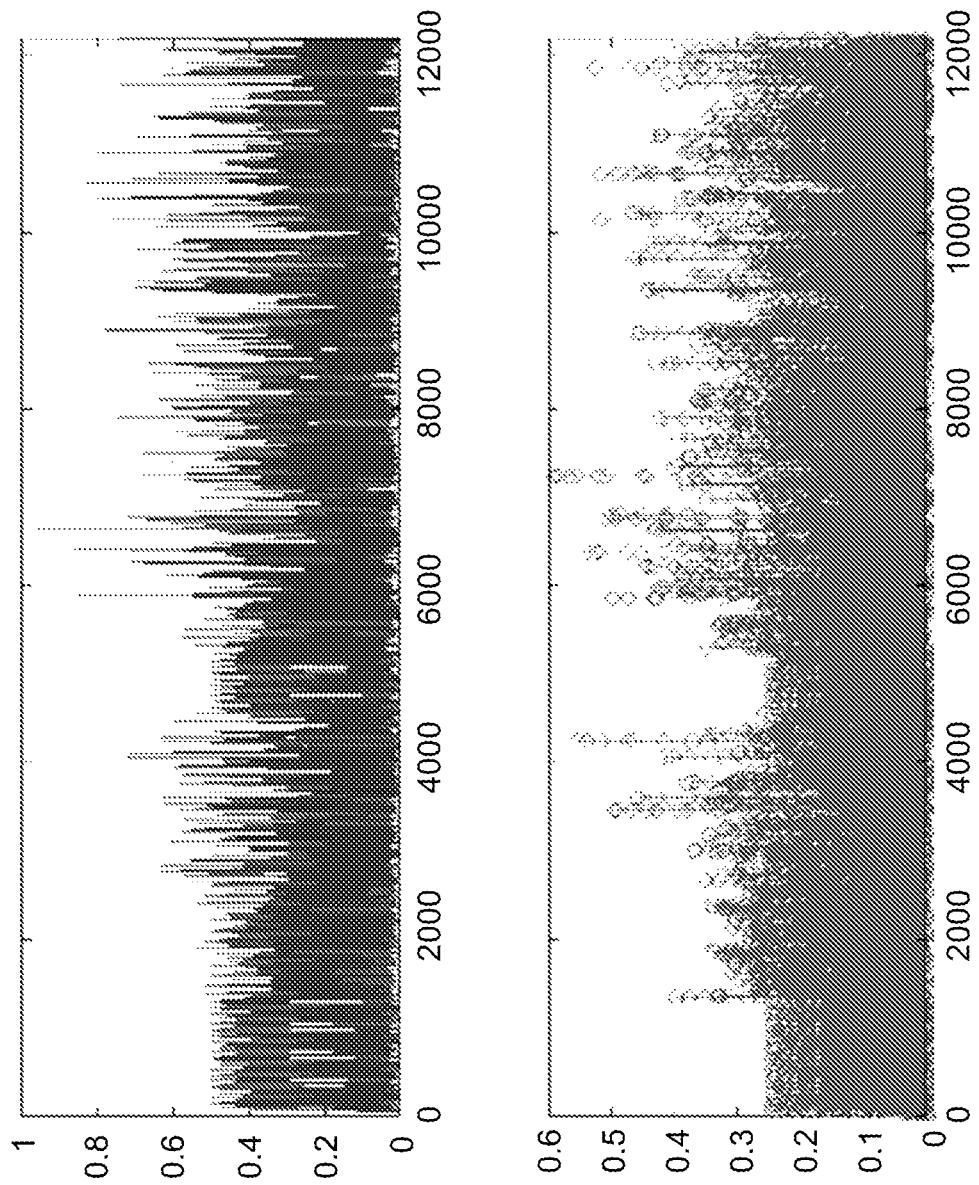
FIG. 7A is a plot showing overlap of I and Q data bits in communication systems that upconvert without the disclosed embodiments.

Referring now to FIG. 7A is a plot 700A showing overlap of I and Q data bits in communication systems that upconvert without the disclosed embodiments. In FIG. 7A, X-Axis represents data bit samples, a top Y-Axis represents an amplitude (or magnitude) of the I data bits and the Q data bits, and a bottom Y-Axis represents an amplitude of the overlap of the I data bits and the Q data bits. The amplitude of the overlap corresponds to duty cycle overlap mismatch of I data bits and Q data bits, which causes interference signals in the RF signal 228 due to non-linear upconverting.

Referring now to FIG. 7B is a plot 700B showing overlap of I and Q data bits in communication systems that upconvert using embodiments disclosed herein. In FIG. 7B, X-Axis represents data bit samples, a top Y-Axis represents an amplitude (or magnitude) of the I data bits and the Q data bits, and a bottom Y-Axis represents an amplitude of the overlap of the I data bits and the Q data bits. Advantageously, in some embodiments, reversing an order of the Q data samples can reduce or minimize a number of RF digital transmitter cells at which I data bits and Q data bits are simultaneously received, thereby reducing a magnitude of interference signals generated due to duty cycle overlap mismatch.

Figure 8:
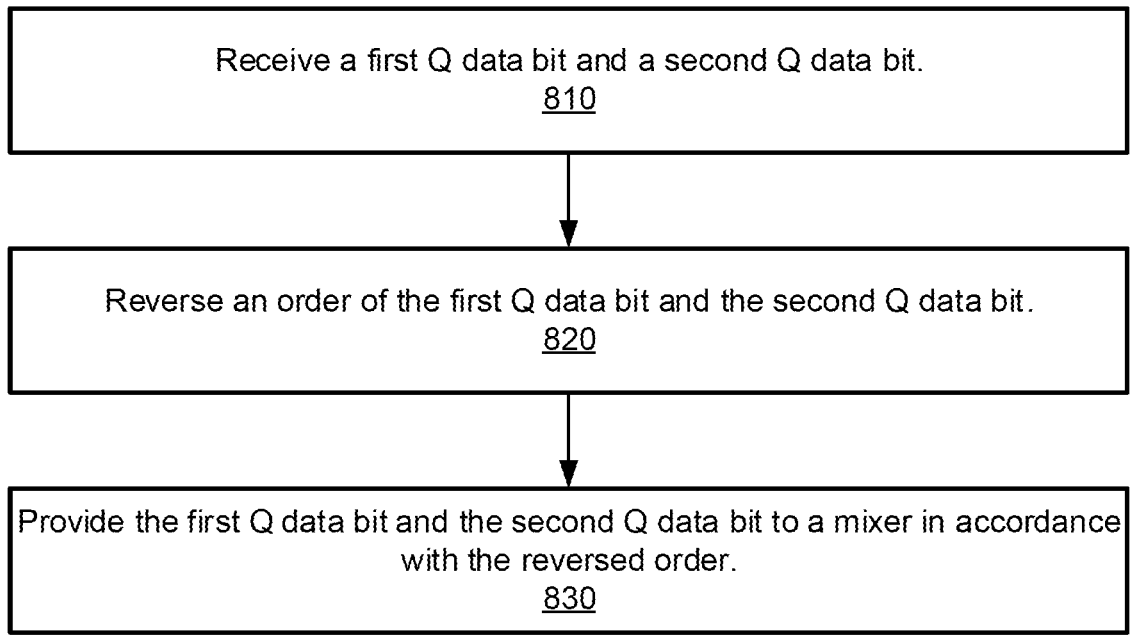
FIG. 8 is a flow chart depicting a process of reversing an order of Q data bits, in one or more embodiments.

Referring to FIG. 8, illustrated is a flow chart depicting a process 800 of reversing an order of Q data bits, in one or more embodiments. In some embodiments, the process 800 is performed by the system 600 shown in FIG. 6 or the system 200 shown in FIG. 2. In other embodiments, the process 800 is performed by other entities. In some embodiments, the process 800 includes more, fewer, or different operations than shown in FIG. 8. In some embodiments, one or more operations of the process 800 can be combined with one or more operations of the process 400 of FIG. 4 or one or more operations of the process 500 of FIG. 5.

At operation 810, the system 600 receives a first Q data bit and a second Q data bit. In some embodiments, the system 600 receives the first Q data bit at a first input port through a first conductor coupled to the first input port. In some embodiments, the system 600 receives the second Q data bit at a second input port through a second conductor coupled to the second input port. In one aspect, the second input port is disposed below the first input port and the second conductor is disposed below the first conductor. In some embodiments, the system 600 receives a first I data bit and a second I data bit.

At operation 820, the system 600 reverses an order of the first Q data bit and the second Q data bit. For example, the system 600 may include a multi-stage network such as a Benes network configured to reverse the order of the first Q data bit and the second Q data bit. In some embodiments, the multi-stage network is reconfigurable.

At operation 830, the system 600 provides the first Q data bit and the second Q data bit to a mixer in accordance with the reversed order. For example, the system 600 provides the second Q data bit through a third conductor coupled between a first output port and a first mixer cell and the system 600 provides the first Q data bit through a fourth conductor coupled between a second output port and a second mixer cell. In one aspect, the second output port is disposed below the first output port and the fourth conductor is disposed below the third conductor. In some embodiments, the system 600 provides the first I data bit and the second I data bit in a same order in which the system 600 received the first I data bit and the second I data bit.

Figure 9:
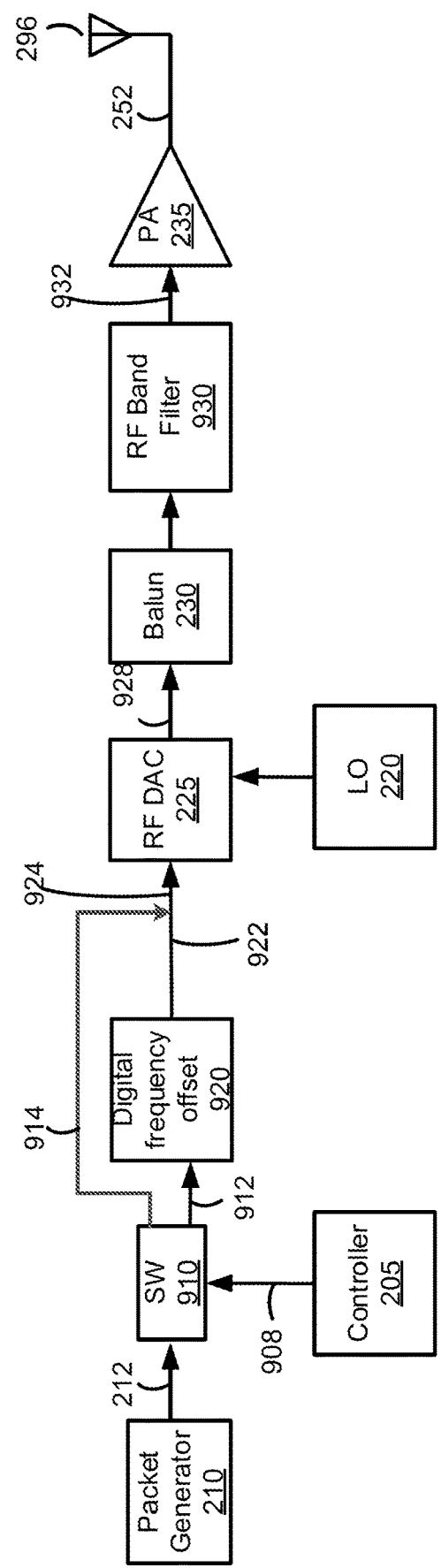
FIG. 9 is a block diagram depicting a communication system, in one or more embodiments.

Referring to FIG. 9, illustrated is a block diagram depicting a communication system 900, in one or more embodiments. The communication system 900 may be part of the system 200 of FIG. 2. In some embodiments, the communication system 900 includes the controller 205 of FIG. 2, the packet generator 210 of FIG. 2, a switch (SW) 910, a digital frequency offset block 920, the radio frequency (RF) digital transmitter 225 of FIG. 2, the balun 230 of FIG. 2, an RF band filter 930, the power amplifier (PA) 235 of FIG. 2, and the antenna 296 of FIG. 2. In some implementations, these components are implemented on an application specific integrated circuit (ASIC), a field programmable gate logic (FPGA) or a combination of them. In some embodiments, the communication system 900 includes more, fewer, or different components than shown in FIG. 9. In some embodiments, the components 910 and 920 are implemented as digital circuits, and the component 930 is implemented as analog circuits or a combination of analog circuits and digital circuits.

In some embodiments, the controller 205 is a component that generates the control bit 908 to determine whether to use a low-intermediate frequency (low-IF) architecture for transmitting the packet 212. In some embodiments, the controller 205 generates the control bit 908 at a first state in response to determining that the packet 212 is assigned to a resource unit (RU) located on one of a lowest frequency or highest frequency of a predetermined band of frequencies. Advantageously, in some embodiments, selecting the low-IF architecture for transmitting the packet 212 can improve EVM by generating the interference signals outside of the band to be filtered by the RF band filter 930.

In some embodiments, the switch 910 is a component that provides the packet 212 to one of the digital (e.g., carrier) frequency offset block 920 and the RF digital transmitter 225 based on the control bit 908. In one configuration, the switch 910 includes an input port, a control port, a first output port, and a second output port. In one configuration, the input port of the switch 910 is coupled to the output port of the packet generator 210, the control port of the switch 910 is coupled to the output port of the controller 205, the first output port of the switch 910 is coupled to an input port of the digital frequency offset block 920 and the second output port of the switch 910 is coupled to an input port of the RF digital transmitter 225. In some embodiments, in response to receiving, at the control port, the control bit 908 having a first state (e.g., a first voltage level), the switch 910 couples the input port to the first output port to provide the packet 212 to the digital frequency offset block 920 through the first output port as the second packet 912. In some embodiments, the packet 912 is same or substantially same as the packet 212. In some embodiments, in response to receiving, at the control port, the control bit 908 having a second state (e.g., a second voltage level different from the first voltage level), the switch 910 couples the input port to the second output port to provide the packet 212 to the RF digital transmitter 225 through the second output port as the packet 914. In some embodiments, the packet 914 is same or substantially same as the packet 212.

Although not shown in FIG. 9, in some embodiments, the communication system 900 includes the interference canceller 215 of FIG. 2, the input port of the switch 910 is coupled to the output port of the interference canceller 215, and the input port of the interference canceller 215 is coupled to the output port of the packet generator 210.

Although not shown in FIG. 9, in some embodiments, the communication system 900 includes the components of the communication system 200 for providing a loop back to calibrate the coefficient and provide the coefficient to the interference canceller 215.

In some embodiments, the digital frequency offset block 920 is a component that digitally upconverts the packet 914 from a baseband frequency to an intermediate frequency (IF) frequency to generate an IF packet 922 and provide the IF packet 922, through the output port of the digital frequency offset block 920, to the RF digital transmitter 225. In some embodiments, the digital frequency offset block 920 has an input port coupled to the output port of the switch 910 and an output port coupled to the input port of the RF digital transmitter 225. In some embodiments, the digital frequency offset block 920 multiplies the packet 912 by $\cos(f_c)+\sin(f_c)$, where $f_c$ is the IF frequency. Advantageously, providing the RF digital transmitter 225 with the IF packet 922 may reduce, for example, duty cycle overlap mismatch of the RF digital transmitter 225, IQ mismatch of the RF digital transmitter 225, second order intermodulation of the RF digital transmitter 225, or LOFT of the RF digital transmitter 225) of the amplified transmit RF signal 252 that is transmitted by the antenna 296, etc.

In some embodiments, the RF digital transmitter 225 is a component that upconverts the packet 924 from a first frequency to an RF frequency to generate the upconverted packet 928 and provide the upconverted packet 928 to the balun 230. The RF digital transmitter 225 may receive a packet 924 at the input port of the RF digital transmitter 225. In some embodiments, in response to the switch 910 receiving, at the control port of the switch 910, the control bit 908 having the first state, the packet 924 received by the RF digital transmitter 225 is same as the IF packet 922. In some embodiments, in response to the switch 910 receiving, at the control port of the switch 910, the control bit 908 having the second state, the packet 924 received by the RF digital transmitter 225 is same as the packet 914. In some embodiments, the RF digital transmitter 225 has an input port coupled to the output port of the switch 910 and the output port of the digital frequency offset block 920. In some embodiments, the RF digital transmitter 225 has an output port coupled to the port of the balun 230.

In some embodiments, the communication system 900 includes a multiplexer that has a first input port coupled to the output port of the digital frequency offset block 920, a second input port coupled to the output port of the switch 910, a control port coupled to the controller 205, and an output port coupled to the input port of the RF digital transmitter 225 to generate the packet 924. In some embodiments, in response to receiving, at the control port, a first control bit having a first state, the multiplexer couples the first input port to the output port. In some embodiments, in response to receiving, at the control port, a first control bit having a second state, the multiplexer couples the second input port to the output port.

In some embodiments, the RF band filter 930 is a component that attenuates interference signals out of a band of frequencies in which the upconverted packet 928 is spectrally located. In some embodiments, in response to receiving the upconverted packet 928 that is assigned to resource unit (RU) located on one of a lowest frequency or a highest frequency within the band and a first interference signal outside of the band, the RF band filter 930 attenuates the first interference signal by a first amount greater than a second amount by which the RF band filter 930 attenuates the upconverted packet 928.

Figure 10:
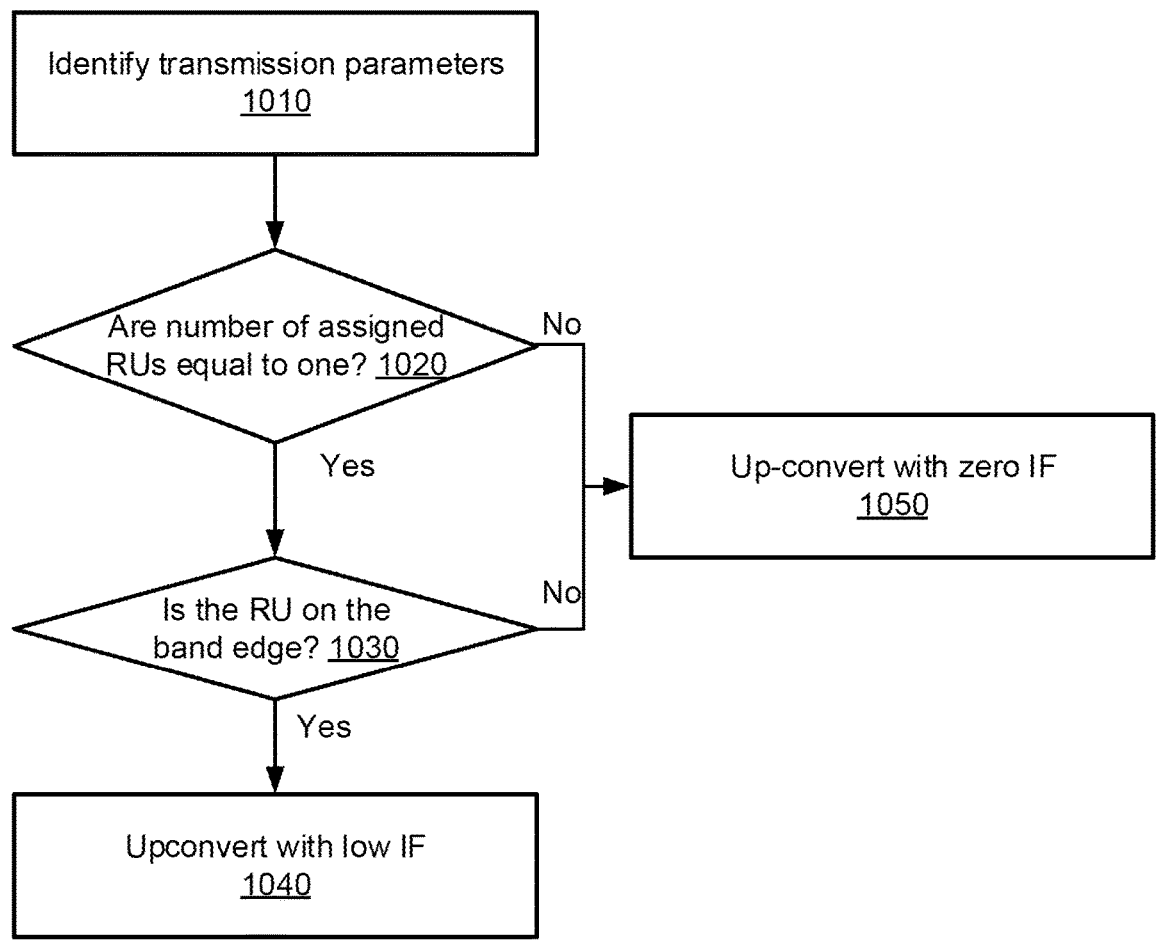
FIG. 10 is a flow chart depicting a process of selecting a method of upconverting, in one or more embodiments.

Referring to FIG. 10, illustrated is a flow chart depicting a process 1000 of selecting a method of upconverting, in one or more embodiments. In some embodiments, the process 1000 is performed by the system 900 shown in FIG. 9 or the system 200 shown in FIG. 2. In other embodiments, the process 1000 is performed by other entities. In some embodiments, the process 1000 includes more, fewer, or different operations than shown in FIG. 10. In some embodiments, one or more operations of the process 1000 can be combined with one or more operations of the process 400 of FIG. 4, one or more operations of the process 500 of FIG. 5, or one or more operations of the process 800 of FIG. 8.

At operation 1010, the system 900 identifies transmission parameters for transmitting the packet 212. For example, the system 900 identifies parameters for determining a number of RUs that the packet 212 is assigned to and parameters for determining whether the RU is at a band edge.

At operation 1020, the system 900 determines whether the number of RUs that the packet 212 is assigned to is equal to one. In some embodiments, an RU unit is a predetermined frequency sub-band or frequency channel. In some embodiments, the system 900 determines whether the number of RUs that the packet 212 is assigned to is equal to one by determining whether a bandwidth assigned to the packet 212 is greater than the predetermined frequency sub-band or frequency channel.

In response to determining that the number of RUs that the packet 212 is assigned to is equal to one, at operation 1030, the system 900 determines whether the RU is on the band edge. In some embodiments, the system 900 determines whether the RU is on the band edge by determining whether a first frequency band of the RU matches a second frequency band of a lowest sub-frequency band/channel or a highest sub-frequency band/channel of the band. In some embodiments, in response to determining that the first frequency band of the RU matches the second frequency band of a lowest sub-frequency band/channel or a highest sub-frequency band/channel of the band, the system may determine that RU is on the band edge.

In response to determining that the RU is on the band edge, at operation 1040, the system 900 upconverts the packet 212 using the low-IF architecture. In some embodiments, the system 900 uses the low-IF architecture by generating the control bit 908 in a first state and apply the control bit 908 to a switch (e.g., switch 910) that is coupled, at a first output, to a low-IF path and, at a second output, to a zero-IF path. In some embodiments, the switch (e.g., switch 910) provides the packet 212 to the low-IF path, in response to the first state.

In response to determining that the RU is not on the band edge, or in response to determining that the number of RUs that the packet 212 is assigned to is greater than one, at operation 1050, the system 900 upconverts the packet 212 using the zero-IF architecture. In some embodiments, the system 900 uses the zero-IF architecture by generating the control bit 908 in a second state and applies the control bit 908 to the switch (e.g., switch 910). In some embodiments, the switch (e.g., switch 910) provides the packet 212 to the zero-IF path, in response to the second state.

Figure 11:
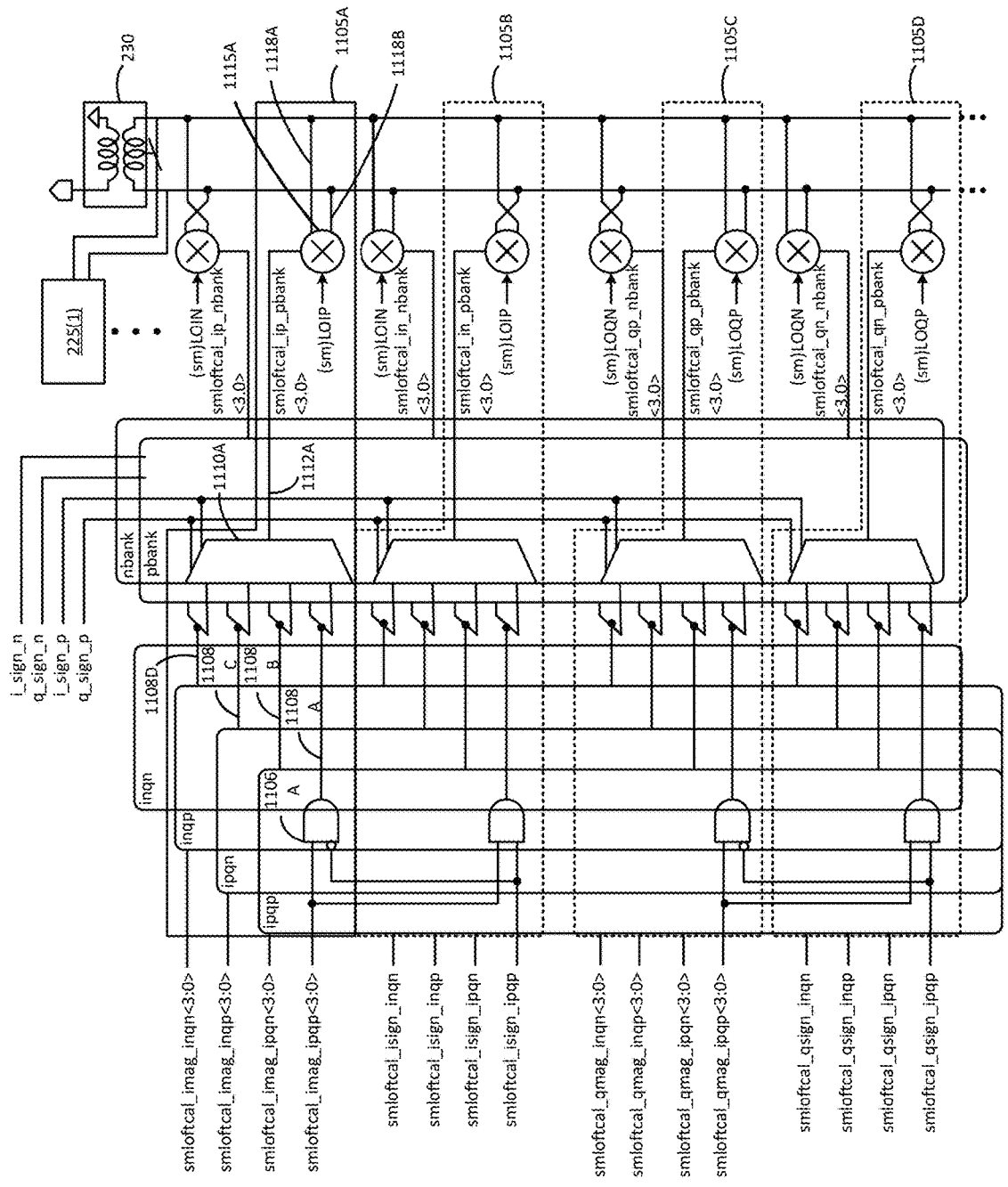
FIG. 11 is a block diagram of a communication system, in one or more embodiments.

Referring now to FIG. 11, illustrated is a block diagram of a communication system 1100, in one or more embodiments. The communication system 1100 may be part of the system 200 of FIG. 2. The communication system 100 includes N calibration paths. For simplicity, calibration paths 1105A, 1105B, 1105C, and 1105D are shown. In some embodiments, N equals 8. In some embodiments, the calibration path 1105A includes a first input port for receiving bits smloftcal_imag_ipqp<3:0>. In some embodiments, the calibration path 1105A includes a second input port for receiving bits smloftcal_imag_ipqn<3:0>. In some embodiments, the calibration path 1105A includes a third input port for receiving bits smloftcal_imag_ingp<3:0>. In some embodiments, the calibration path 1105A includes a fourth input port for receiving bits smloftcal_imag_ingn<3:0>. In some embodiments, the calibration path 1105A includes a fifth input port for receiving bits smloftcal_isign_ipqp<3:0>. In some embodiments, the calibration path 1105A includes a sixth input port for receiving bits smloftcal_isign_ipqn<3:0>. In some embodiments, the calibration path 1105A includes a first select port for receiving bits smloftcal_isign_ingp<3:0>. In some embodiments, the calibration path 1105A includes a second select port for receiving bits smloftcal_isign_ingn<3:0>. In some embodiments, the calibration path 1105A includes a ninth input port for receiving a select bit i_sign_p. In some embodiments, the calibration path 1105A includes a tenth input port for receiving a select bit q_sign_p. In some embodiments, the calibration path 1105A includes a first output port for providing a LOFT calibration signal 1118A. In some embodiments, the calibration path 1105A includes a second output port for providing a LOFT calibration signal 1118B.

In some embodiments, the calibration path 1105A includes a NAND gate 1106A with an inverting input (e.g., an input in series with an inverter). In some embodiments, the NAND gate 1106A has a non-inverting input port coupled to the output port of the first input of the calibration path 1105A, an inverting input port coupled to the fifth input port of the calibration path 1105A, and an output port to provide a modified calibration coefficient 1108A. Although not shown, in some embodiments, the calibration path 1105A includes NAND gates 1106B, 1106C, and 1106D. In some embodiments, the NAND gate 1106B has a non-inverting input port coupled to the output port of the second input of the calibration path 1105A, an inverting input port coupled to the sixth input port of the calibration path 1105A, and an output port to provide a modified calibration coefficient 1108B. In some embodiments, the NAND gate 1106C has a non-inverting input port coupled to the output port of the third input of the calibration path 1105A, an inverting input port coupled to the seventh input port of the calibration path 1105A, and an output port to provide a modified calibration coefficient 1108C. In some embodiments, the NAND gate 1106D has a non-inverting input port coupled to the output port of the fourth input of the calibration path 1105A, an inverting input port coupled to the eighth input port of the calibration path 1105A, and an output port to provide a modified calibration coefficient 1108D. The modified calibration coefficient 1108A can be a calibration coefficient for Tx data (e.g., Tx data of the packet 212, compensated Tx data 218, etc.) in a first quadrant, the modified calibration coefficient 1108B can be a calibration coefficient for Tx data in a second quadrant, the modified calibration coefficient 1108C can be a calibration coefficient for Tx data in a third quadrant, and the modified calibration coefficient 1108D can be a calibration coefficient for Tx data in a fourth quadrant. In some embodiments, the modified calibration coefficients 1108A-1108D compensate for LOFT such as a voltage level offset in a predetermined band (e.g., −1 kHz to 1 kHz) centered at DC (e.g., 0 Hz) of the Tx data.

In some embodiments, the calibration path 1105A includes a multiplexer 1110A. In some embodiments, the multiplexer 1110A has a first input port coupled to the output port of the NAND gate 1106A to receive the modified calibration coefficient 1108A, a second input port coupled to the output port of the NAND gate 1106B to receive the modified calibration coefficient 1108B, a third input port coupled to the output port of the NAND gate 1106C to receive the modified calibration coefficient 1108C, and a fourth input port coupled to the output port of the NAND gate 1106D to receive the modified calibration coefficient 1108D, a first select port for receiving a select bit i_sign_p, a second select port for receiving a select bit q_sign_p. In some embodiments, the select bit i_sign_p indicates a first sign of an in-phase portion of the Tx data and the select bit q_sign_p indicates a second sign of a quadrature portion of the Tx data. In some embodiments, the Tx data is complex, including real part and an imaginary part, the in-phase portion is the real part of the Tx data, and the quadrature portion is the imaginary part of the Tx data. Advantageously, selecting a calibration coefficient based on a quadrant can compensate for quadrant-dependent LOFT.

In some embodiments, the multiplexer 1110A has an output port to provide selected calibration coefficient 1112A (e.g., smloftcal_ip_pbank<3:0>). In some embodiments, the selected calibration coefficient 1112A is provided based on the select bit i_sign_p and the select bit q_sign_p. In one aspect, if the select bit i_sign_p has a first state (e.g., 1, VDD) and the select bit q_sign_p has the first state, the multiplexer couples the first input port to the output port to provide the modified calibration coefficient 1108A as the selected calibration coefficient 1112A. In one aspect, if the multiplexer receives the select bit i_sign_p having the first state and the select bit q_sign_p having a second state (e.g., 0, 0V, ground), the multiplexer couples the second input port to the output port to provide the modified calibration coefficient 1108B as the selected calibration coefficient 1112A. In one aspect, if the multiplexer receives the select bit i_sign_p having the second state and the select bit q_sign_p having the first state, the multiplexer couples the third input port to the output port to provide the modified calibration coefficient 1108C as the selected calibration coefficient 1112A. In one aspect, if the multiplexer receives the select bit i_sign_p having the second state and the select bit q_sign_p having the second state, the multiplexer couples the fourth input port to the output port to provide the modified calibration coefficient 1108D as the selected calibration coefficient 1112A.

In some embodiments, the calibration path 1105A includes an RF digital transmitter cell (e.g., mixer cell) 1115A. In some embodiments, the RF digital transmitter cell 1115A has a first input port coupled to the output port of the multiplexer 1110A to receive the selected calibration coefficient 1112A, a second input port coupled to receive a first LO signal, a first output port coupled to the first port of the balun 230 to selectively provide the LOFT calibration signal 1118A, and the second output port coupled to a second port of the balun 230 to selectively provide the LOFT calibration signal 1118B. In one configuration, the RF digital transmitter cell 1115A provides the LOFT calibration signal 1118A through the first output port and disables the second LOFT calibration signal 1118B.

In some embodiments, the communication system 1100 includes N RF digital transmitter cells to provide N, or 2*N, transmit RF signals. For simplicity, the RF digital transmitter cell 225(1) is shown. In some embodiments, the RF digital transmitter cell 225(1) includes a first output port coupled to the first port of the balun to selectively provide a first transmit RF signal (e.g., the transmit RF signal 228) and a second output port coupled to the second port of the balun to selectively provide a second transmit RF signal. In some embodiments, the first transmit RF signal and the second transmit RF signal are upconverted from the Tx data. In one configuration, the RF digital transmitter cell 225(1) provides the first transmit RF signal through the first output port and disables the second transmit RF signal. In some embodiments, the balun 230 receives the first transmit RF signal having LOFT and the LOFT calibration signal 1118A to cancel the LOFT and generate a corrected transmit RF signal that does not include the LOFT.

Figure 12:
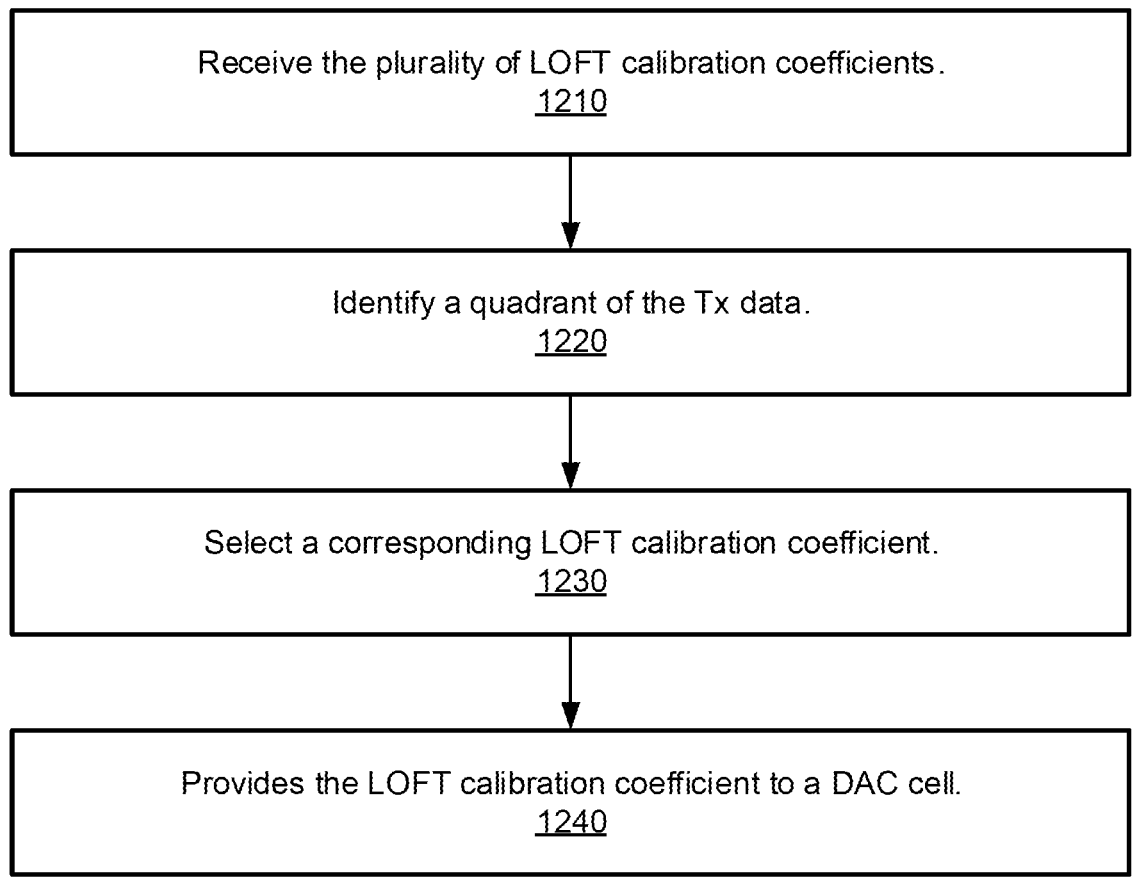
FIG. 12 is a flow chart depicting a process of selecting a LOFT calibration coefficient.

Referring to FIG. 12, illustrated is a flow chart depicting a process 1200 of selecting a LOFT calibration coefficient. In some embodiments, the process 1200 is performed by the system 1100 shown in FIG. 11 or the system 200 shown in FIG. 2. In other embodiments, the process 1200 is performed by other entities. In some embodiments, the process 1200 includes more, fewer, or different operations than shown in FIG. 12. In some embodiments, one or more operations of the process 1200 can be combined with one or more operations of the process 400 of FIG. 4, one or more operations of the process 500 of FIG. 5, one or more operations of the process 800 of FIG. 8, or one or more operations of the process 1000 of FIG. 10.

At operation 1210, the system receives a plurality of LOFT calibration coefficients. For example, the system 1100 receives 4 LOFT calibration coefficients. In some embodiments, the 4 LOFT calibration coefficients include the modified calibration coefficients 1108A, 1108B, 1108C, and 1108D.

At operation 1220, the system 1100 may identify a quadrant of the Tx data. In some embodiments, the system 1100 identifies a quadrant of the Tx data by identifying a first sign bit of the I portion of the Tx data and a second sign bit of the Q portion of the Tx data.

At operation 1230, the system 1100 may select a first LOFT calibration coefficient corresponding to the quadrant of the Tx data. In some embodiments, the system 1100 selects the first LOFT calibration coefficient based on identifying the first sign bit of the I portion of the Tx data and the second sign bit of the Q portion of the Tx data.

At operation 1240, the system 1100 may provide the first LOFT calibration coefficient to a transmitter cell. In some embodiments, the RF digital transmitter cell upconverts the first LOFT calibration coefficient to generate a LOFT calibration signal. In some embodiments a second RF digital transmitter cell upconverts Tx data to generate a transmit RF signal. In some embodiments, a balun 230 coupled to the RF digital transmitter cell and the second RF digital transmitter cell receives the first LOFT calibration signal and the transmit RF signal, and generates a corrected transmit RF signal according to the first LOFT calibration signal and the transmit RF signal. In some embodiments, the LOFT calibration signal cancels the LOFT of the transmit RF signal at the balun 230 to generate the corrected transmit RF signal.

Figure 13:
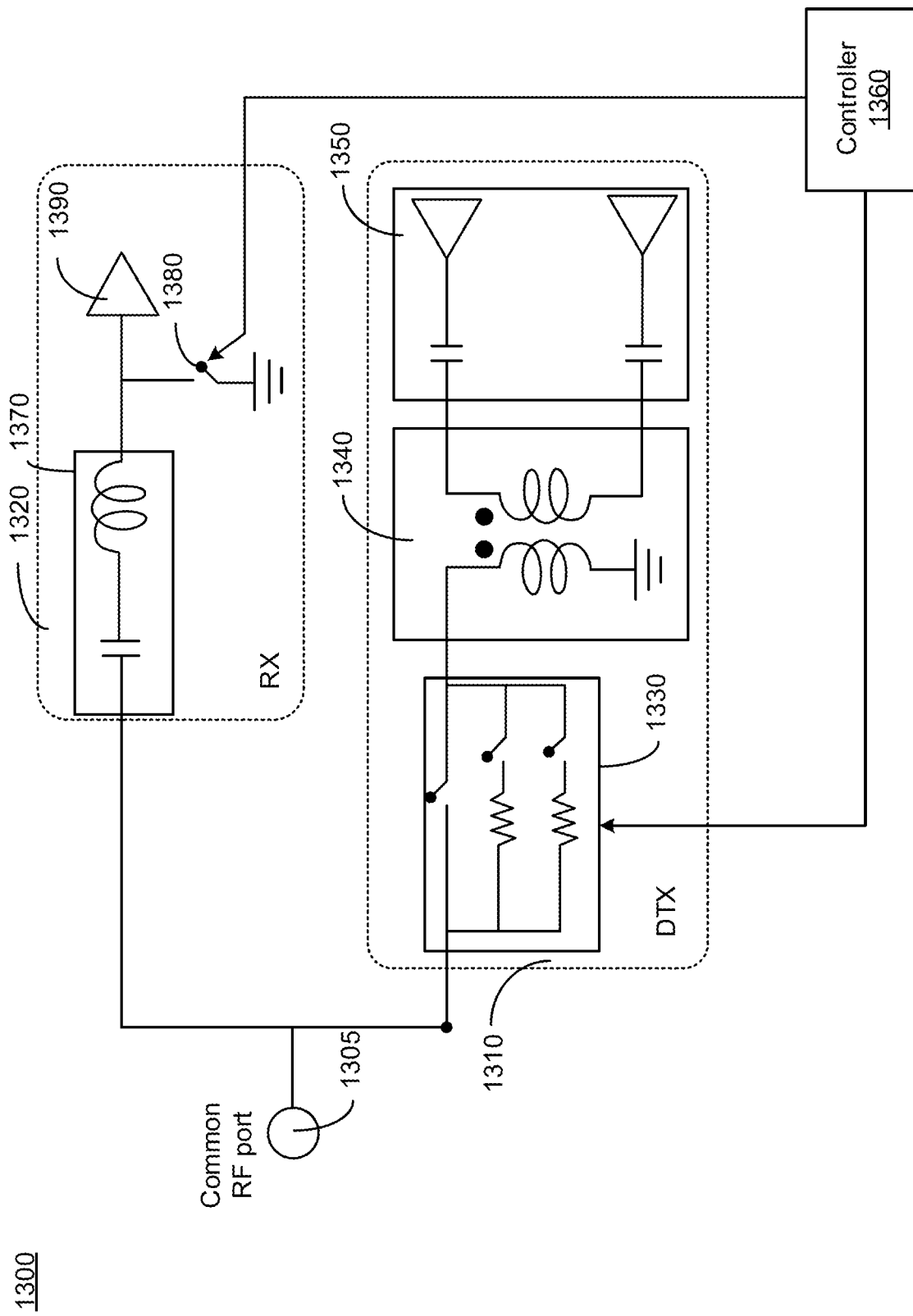
FIG. 13 is a block diagram of a communication system, in one or more embodiments.

Referring now to FIG. 13, illustrated is a block diagram of a communication system 1300, in one or more embodiments. The communication system 1300 may be part of the system 200 of FIG. 2. In some embodiments, the communication system 1300 includes a common RF port (e.g., antenna) 1305, a digital transmit (Tx) path 1310, a receive (Rx) path 1320, and a controller 1360. In some embodiments, the Tx path 1310 includes an output port coupled to the common RF port 1305 of the communication system 1300, N control ports, an RF attenuator 1330, a balun 1340, and an RF digital transmitter 1350. In some embodiments, the balun 1340 may be the balun 230 of FIG. 2. In some embodiments, the RF digital transmitter 1350 may be the RF digital transmitter 225 of FIG. 2.

Figure 14:
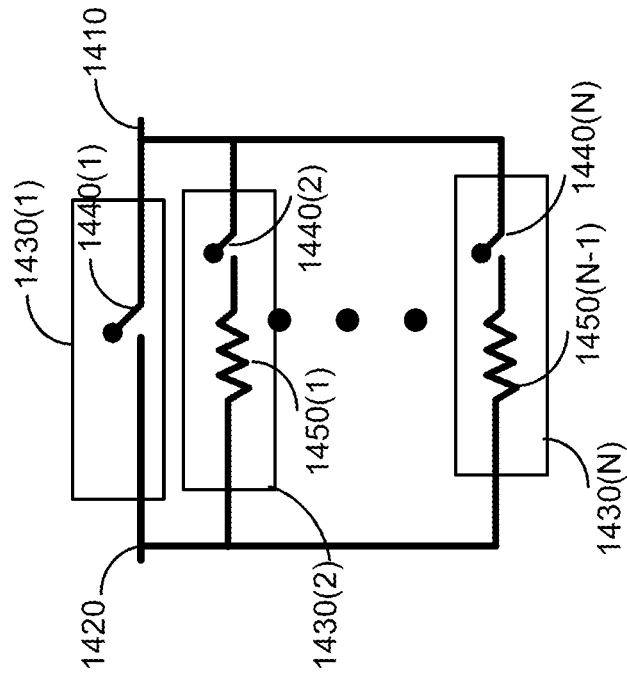
FIG. 14 is a block diagram of the RF attenuator, in one or more embodiments.

Referring now to FIG. 14, illustrated is a block diagram of the RF attenuator 1330, in one or more embodiments. In some embodiments, the RF attenuator 1330 includes an input port 1410 coupled to the balun 1340 of FIG. 13, an output port 1420 coupled to the output port of the Tx path 1310, and N attenuator paths coupled between the input port 1410 and the output port 1420. For simplicity, the attenuator paths 1430(1), 1430(2), and 1430(N) are shown. In some embodiments, the attenuator path 1430(1) includes a switch 1440(1). In some embodiments, the switch 1440(1) includes a control port coupled to the controller 1360 to receive a first control signal, an input port coupled to the input port 1410 of the RF attenuator 1330 to receive a Tx signal, for example from the RF digital transmitter 1350, and an output port coupled to the output port 1420 of the RF attenuator 1330 to selectively provide the Tx signal. In some embodiments, in response to the switch 1440(1) receiving the first control signal having a first state (e.g., 1, VDD), the switch 1440(1) couples the input port to the output port to provide the Tx signal to the output port. In some embodiments, in response to the switch 1440(1) receiving the first control signal having a second state (e.g., 0, ground), the switch 1440(1) decouples the input port from the output port to disable Tx signal (e.g., the Tx signal through the attenuator path 1430(1)).

In some embodiments, the attenuator path 1430(2) includes a switch 1440(2) and an attenuator 1450(1) having a first attenuator value (e.g., resistor value or a capacitor value), an input port and an output port. In some embodiments, the switch 1440(2) includes a control port coupled to the controller 1360 to receive a second control signal, an input port coupled to the input port 1410 of the RF attenuator 1330 to receive the Tx signal and an output port coupled to the input port of the attenuator 1450(1) to selectively provide the Tx signal. In some embodiments, in response to the switch 1440(2) receiving the second control signal having the first state, the switch 1440(2) couples the input port to the output port to provide the Tx signal to the attenuator 1450(1). In some embodiments, in response to the switch 1440(2) receiving the second control signal having the second state, the switch 1440(2) decouples the input port from the output port to disable Tx signal (e.g., the Tx signal through the attenuator path 1430(2)). In some embodiments, the attenuator 1450(1) receives the Tx signal through the input port of the attenuator 1450(1). In some embodiments, the attenuator 1450(1) attenuates the Tx signal by an attenuation value according to the first attenuator value of the attenuator 1450(1). In some embodiments, the attenuator 1450(1) is coupled to the output port 1420 of the RF attenuator 1330 to provide a first attenuated Tx signal.

In some embodiments, the attenuator path 1430(N) includes a switch 1440(N) and an attenuator 1450(N−1) having a second attenuator value (e.g., resistor value or a capacitor value), an input port and an output port. In some embodiments, the switch 1440(N) includes a control port coupled to the controller 1360 to receive a third control signal, an input port coupled to the input port 1410 of the RF attenuator 1330 to receive the Tx signal and an output port coupled to the input port of the attenuator 1450(N−1) to selectively provide the Tx signal. In some embodiments, in response to the switch 1440(N) receiving the third control signal having the first state, the switch 1440(N) couples the input port to the output port to provide the Tx signal to the attenuator 1450(N−1). In some embodiments, in response to the switch 1440(N) receiving the third control signal having the second state, the switch 1440(N) decouples the input port from the output port to disable Tx signal (e.g., the Tx signal through the attenuator path 1430(N)). In some embodiments, the attenuator 1450(N−1) receives the Tx signal through the input port of the attenuator 1450(N−1). In some embodiments, the attenuator 1450(N−1) attenuates the Tx signal by a second attenuation value according to the second attenuator value of the attenuator 1450(N−1). In some embodiments, the attenuator 1450(N−1) is coupled to the output port 1420 of the RF attenuator 1330 to provide a second attenuated Tx signal. In some embodiments, the second attenuation value is greater than the first attenuation value. In some embodiments, the first attenuated Tx signal has a first magnitude larger than a second magnitude of the second attenuated Tx signal. In some embodiments, for the attenuator paths 1430(2)-1430(N), the input port of the switch 1440(X) is coupled to the input port of the attenuator 1450(X−1) and the output port of the switch(X) is coupled to the output port 1420 of the RF attenuator 1330. In some embodiments, more than one of the switches 1440(1)-1440(N) are enabled. Advantageously, selectively enabling one or more of N attenuator paths allows the controller 1360 to control/change/optimize/reduce a power level (e.g., gain level, attenuation level) of the Tx signal adaptively. Advantageously, the RF attenuator 1330 is used for gain reduction in which the Tx signal power level is low enough not to cause any linearity or reliability degradation.

Referring now to FIG. 13, in some embodiments, the Rx path 1320 includes an input port coupled to the common RF port 1305 of the communication system 1300, a control port, a matching network 1370, a shunt switch 1380, and a low-noise amplifier (LNA) 1390. In some embodiments, the matching network 1370 has an input port coupled to the input port of the Rx path 1320 and an output port coupled to an input port of the LNA 1390.

In some embodiments, the shunt switch 1380 includes a control port coupled to the controller 1360 to receive a Rx control signal from the controller 1360, a signal port coupled to the output port of the matching network 1370 to receive an Rx signal from the antenna and a ground port coupled ground to selectively provide the Rx signal to the LNA 1390. In some embodiments, in response to the shunt switch 1380 receiving the Rx control signal having a first state (e.g., 1, VDD), the shunt switch 1380 couples the signal port to the ground port to disable the matching network 1370 from providing the Rx signal to the LNA 1390. In some embodiments, in response to the shunt switch 1380 receiving the Rx control signal having a second state (e.g., 0, ground), the shunt switch 1380 decouples the signal port from the ground port to enable the matching network 1370 to provide the Rx signal to the LNA 1390.

In some embodiments, in response to the controller 1360 determining that the communication system 1300 is to operate in a Tx mode, the controller 1360 provides one of the Tx control signals (e.g., the first control signal) having the first state to the RF attenuator 1330 to enable the Tx path 1310 and provides the Rx control signal having the first state to the shunt switch 1380 to disable the Rx path 1320. In some embodiments, in response to the controller 1360 determining that the communication system 1300 is to operate in an Rx mode, the controller 1360 provides one of the Tx control signals (e.g., the first control signal) having the second state to the RF attenuator 1330 to disable the Tx path 1310 and provides the Rx control signal having the second state to the shunt switch 1380 to enable the Rx path 1320. Advantageously, selectively enabling one of the Rx path 1320 and the Tx path 1310 and disabling another of the Rx path 1320 and the Tx path 1310 allows the communication system 1300 to use one common RF port 1305 to support the Rx path 1320 and the Tx path 1310.

Figure 15:
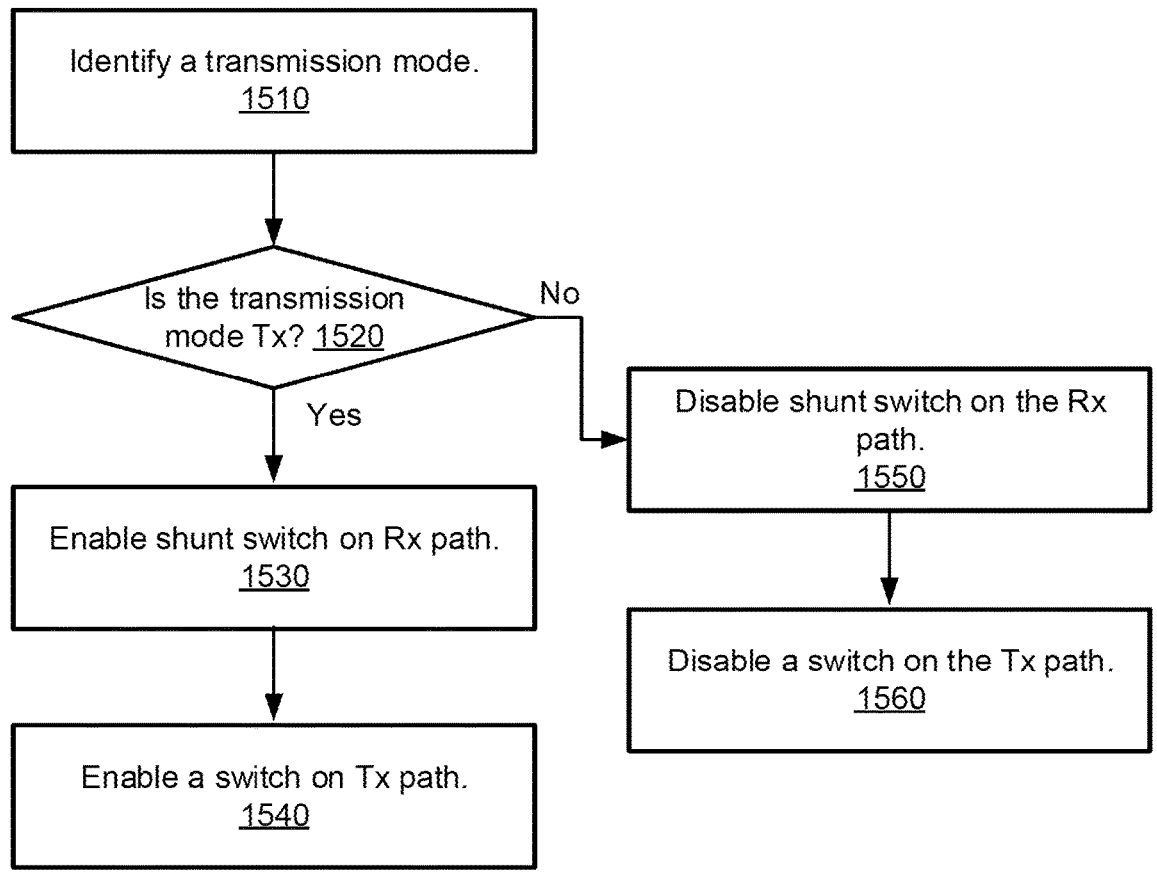
FIG. 15 is a flow chart depicting a process of configuring a transmission mode, in one or more embodiments.

Referring to FIG. 15, illustrated is a flow chart depicting a process 1500 of configuring a transmission mode, in one or more embodiments. In some embodiments, the process 1500 is performed by the system 1300 shown in FIG. 13 or the system 200 shown in FIG. 2. In other embodiments, the process 1500 is performed by other entities. In some embodiments, the process 1500 includes more, fewer, or different operations than shown in FIG. 15. In some embodiments, one or more operations of the process 1500 can be combined with one or more operations of the process 400 of FIG. 4, one or more operations of the process 500 of FIG. 5, one or more operations of the process 800 of FIG. 8, one or more operations of the process 1000 of FIG. 10, or one or more operations of the process 1200 of FIG. 12.

At operation 1510, the system 1300 may identify or determine a transmission mode. The transmission mode may be one of transmitting a Tx signal or receiving an Rx signal. The Tx signal can be provided and the Rx signal can be received through a common RF port.

At operation 1520, the system 1300 may determine whether the transmission mode is to transmit a Tx signal. In some embodiments, the system 1300 determines whether the transmission mode is to transmit a Tx signal based on a last Rx signal (e.g., Rx packet) received from another communication device.

In some embodiments, in response to determining that the transmission mode is to transmit a Tx signal, at operation 1530, the system 1300 enables the shunt switch 1380 on an Rx path. In some embodiments, the system couples, via the shunt switch 1380, an input port of the LNA 1390 to ground to disable the Rx signal.

At operation 1540, in some embodiments, the system 1300 enables a first switch (e.g., the switch 1440(1) or the switch 1440(2)) on a Tx path. In some embodiments, the system couples, via the first switch, the balun 1340 to the common RF port 1305 to provide the Tx signal. In some embodiments, a first attenuator (e.g., 1450(1)) is coupled between the first switch and the common RF port 1305.

In some embodiments, in response to determining that the transmission mode is not to transmit a Tx signal, at operation 1550, the system 1300 disables the shunt switch 1380 on the Rx path. In some embodiments, the system 1300 decouples, via the shunt switch 1380, the input port of the LNA 1390 from ground to enable the matching network 1370 to provide the Rx signal to the LNA 1390.

At operation 1560, the system 1300 disables the first switch on the Tx path. In some embodiments, the system 1300 decouples, via the first switch, the balun 1340 to the common RF port 1305, e.g., to disable the Tx signal.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities that can operate within a system or environment. It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C#, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A system comprising:
   an antenna;
   a receive (Rx) path coupled to the antenna; and
   a transmit (Tx) path comprising:
      a balun; and
      a radio frequency (RF) attenuator comprising a first port and a second port, the balun coupled to the first port, the antenna coupled to the second port, the RF attenuator comprising:
         a first switch coupled between the first port and the second port;
         a second switch and a first attenuator coupled to each other in series between the first port and the second port, the first attenuator having a first attenuator value; and
         a third switch and a second attenuator coupled to each other in series between the first port and the second port, the second attenuator having a second attenuator value greater than the first attenuator value of the first attenuator.

2. The system of claim 1, wherein the second switch has a second control port, and the third switch has a third control port, and wherein:
   in response to receiving, at the second control port, a first control signal in a first state, the RF attenuator is configured to provide, via the second switch, a Tx signal from the Tx path to the antenna to attenuate the Tx signal by a first attenuation value; and
   in response to receiving, at the second control port, the first control signal in a second state, and, at the second control port, a second control signal in a third state, the RF attenuator is configured to provide, via the third switch, the Tx signal from the Tx path to the antenna to attenuate the Tx signal by a second attenuation value, wherein the second attenuation value is greater than the first attenuation value.

3. The system of claim 1, wherein the Rx path comprises:
   a matching network having i) a first input port coupled to the antenna and ii) a first output port;
   a shunt switch having i) a second input port coupled to the first output port of the matching network, ii) a second output port coupled to ground, and iii) a control port; and
   an amplifier coupled to the first output port of the matching network.

4. The system of claim 3, wherein, in response to receiving, at the control port of the shunt switch, a first control bit in a first state, the shunt switch is configured to couple the first output port of the matching network to the ground to attenuate an Rx signal on the Rx path by a first attenuation value, and
   wherein, in response to receiving, at a second control port of the second switch, a second control bit in a second state, the RF attenuator is configured to provide a Tx signal from the Tx path to the antenna, via the second switch, to attenuate the Tx signal by a second attenuation value, wherein the second attenuation value is less than the first attenuation value.

5. The system of claim 4, wherein, in response to receiving, at the control port of the shunt switch, a first control signal in a third state, the shunt switch is configured to decouple the first output port of the matching network from the ground to attenuate a second Rx signal on the Rx path by a third attenuation value, and
   wherein, in response to receiving, at the second control port of the second switch, a second control signal in a fourth state, the RF attenuator is configured to decouple the Tx path from the antenna.

6. The system of claim 3, comprising:
   a controller communicatively coupled with the RF attenuator and the shunt switch.

7. The system of claim 1, wherein the balun is coupled between the RF attenuator and a digital transmitter.

8. The system of claim 7, wherein the digital transmitter is configured to convert digital representations of packets into analog representations of packets.

9. The system of claim 1, wherein the second switch has a second control port, and the third switch has a third control port, and wherein:
   in response to receiving, at the second control port and the third control port, a first control signal in a first state, the RF attenuator is configured to provide, via the second switch and the third switch, a transmit (Tx) signal from the Tx path to the antenna to concurrently attenuate the Tx signal by a first attenuation value and the second attenuation value.

10. The system of claim 1, wherein the balun performs an impedance transformation.

11. They system of claim 1, wherein the first switch has a first input port and the second switch has a second input port, and
   wherein the first input port of the first switch is coupled with the second input port of the second switch.

12. A method comprising:
   receiving, by a system comprising a first port and a second port, a control signal, the control signal indicating to establish a position of a first switch, second switch and a third switch, the first switch coupled between the first port and the second port, the second switch coupled in series with a first attenuator between the first port and the second port, and the third switch coupled in series with a second attenuator between the first port and the second port;
   establishing, by the system, a position of the first switch, the second switch, and the third switch according to the control signal;
   receiving, by the system at the first port, a signal from a balun;
   attenuating, by the system, the signal by a first value of the first attenuator or a second value of the second attenuator according to the position of the first switch, the second switch, and the third switch, the second value greater than the first value; and
   outputting, by the system, at the second port, the attenuated signal to an antenna.

13. The method of claim 12, wherein the second switch has a second control port and the third switch has a third control port, and wherein:
   in response to receiving, at the second control port, a first control signal in a first state, outputting, by the system via the second switch, a transmit (Tx) signal to the antenna to attenuate the Tx signal by the first value; and
   in response to receiving, at the second control port, the first control signal in a second state, and, at the third control port, a second control signal in a third state, outputting, by the system, via the third switch, the Tx signal to the antenna to attenuate the Tx signal by the second value.

14. The method of claim 12, wherein the second port of the outputting is coupled to:
   a matching network having i) a first input port coupled to the antenna and ii) a first output port;
   a shunt switch having i) a second input port coupled to the first output port of the matching network, ii) a second output port coupled to ground, and iii) a control port; and
   an amplifier coupled to the first output port of the matching network.

15. The method of claim 14, wherein, in response to receiving, at the control port of the shunt switch, a first control bit in a first state, coupling, by the shunt switch, the first output port of the matching network to the ground to attenuate a first signal by the first value, and
   wherein, in response to receiving, at a second control port of the second switch, a second control bit in a second state, outputting, by the system, a transmit (Tx) signal to the antenna, via the second switch, to attenuate the Tx signal by the second value.

16. The method of claim 15, wherein, in response to receiving, at the control port of the shunt switch, a first control signal in a third state, decoupling, by the shunt switch, the first output port of the matching network from the ground to attenuate a second signal by a third value, and
   wherein, in response to receiving, at the second control port of the second switch, a second control signal in a fourth state, decoupling, by the outputting, the balun from the antenna.

17. The method of claim 12, wherein the second switch has a second control port, and the third switch has a third control port, wherein:
   in response to receiving, at the second control port and the third control port, a first control signal in a first state, providing, by the outputting, via the second switch and the third switch, a transmit (Tx) signal to the antenna to concurrently attenuate the Tx signal by the first value and the second value.

18. A system comprising:
   a balun;
   a first port coupled to the balun;
   a second port coupled to an antenna;
   a first switch coupled between the first port and the second port;
   a second switch and a first attenuator coupled to each other in series between the first port and the second port, the first attenuator having a first value indicating amount of attenuation of a signal received from the balun; and
   a third switch and a second attenuator coupled to each other in series between the first port and the second port, the second attenuator having a second value indicating a second amount of attenuation of a signal greater than the first value of the first attenuator, wherein the first switch, the second switch, and the third switch are configured to switch between using the first attenuator and the second attenuator responsive to a control signal.

19. The system of claim 18, wherein the second switch has a second control port, and the third switch has a third control port, wherein:
   in response to receiving, at the second control port, a first control signal in a first state, the system is configured to output, via the second switch, a transmit (Tx) signal to the antenna to attenuate the Tx signal by the first value; and
   in response to receiving, at the second control port, the first control signal in a second state, and, at the second control port, a second control signal in a third state, the system is configured to output, via the third switch, the Tx signal to the antenna to attenuate the Tx signal by the second value.

20. The system of claim 18, wherein the second port of the system is coupled to:
   a matching network having i) a first input port coupled to the antenna and ii) a first output port;
   a shunt switch having i) a second input port coupled to the first output port of the matching network, ii) a second output port coupled to ground, and iii) a control port; and
   an amplifier coupled to the first output port of the matching network.

* * * * *